(12) United States Patent
Bennett et al.

(10) Patent No.: US 8,473,617 B2
(45) Date of Patent: Jun. 25, 2013

(54) MEDIA CLIENT ARCHITECTURE FOR NETWORKED COMMUNICATION DEVICES

(75) Inventors: Jesse W. Bennett, Apex, NC (US); Suri Maddhula, Cary, NC (US); Don W. Schoppe, Apex, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 2405 days.

(21) Appl. No.: 11/114,427

(22) Filed: Apr. 26, 2005

(65) Prior Publication Data

US 2006/0155814 A1    Jul. 13, 2006

Related U.S. Application Data

(60) Provisional application No. 60/640,583, filed on Dec. 31, 2004.

(51) Int. Cl.
*G06F 15/16* (2006.01)

(52) U.S. Cl.
USPC ............................ 709/227; 709/228; 709/229

(58) Field of Classification Search
USPC ......................................................... 709/227
See application file for complete search history.

(56) References Cited

U.S. PATENT DOCUMENTS

| | | | |
|---|---|---|---|
| 7,024,461 B1 * | 4/2006 | Janning et al. | 709/207 |
| 7,050,861 B1 * | 5/2006 | Lauzon et al. | 700/17 |
| 7,296,081 B2 | 11/2007 | Ido | |
| 2002/0078150 A1 * | 6/2002 | Thompson et al. | 709/204 |
| 2002/0103898 A1 * | 8/2002 | Moyer et al. | 709/224 |
| 2002/0120746 A1 * | 8/2002 | Patil et al. | 709/227 |
| 2003/0145054 A1 * | 7/2003 | Dyke | 709/205 |
| 2005/0111390 A1 | 5/2005 | Kobayashi | |

FOREIGN PATENT DOCUMENTS

| | | | |
|---|---|---|---|
| JP | 2001358778 A | | 12/2001 |
| JP | 2002354032 A | | 12/2002 |
| JP | 2004531110 A | | 10/2004 |
| JP | 2005159431 A | | 6/2005 |
| JP | 2005286475 A | | 10/2005 |
| WO | 0147248 A2 | | 6/2001 |
| WO | WO 01/47248 | | 6/2001 |
| WO | WO 01/47248 A2 | * | 8/2001 |
| WO | 02061604 A1 | | 8/2002 |

OTHER PUBLICATIONS

International Search Report mailed Oct. 7, 2005; International Application No. PCT/US2005/024405 filed Jul. 11, 2005.
Johann Reitter: "Controlling and checking devices via the Session Initiation Protocol ÔCô a service for the IM subsystem"; IP.Com Journal, IP.Com Inc., West Henrietta, NY, US, Jul. 23, 2003, XP013011420; ISSN: 153-0001.
Office Action issued in Japanese Patent Application No. 2007-549346 filed Jun. 29, 2007.

* cited by examiner

*Primary Examiner* — Derrick Ferris
*Assistant Examiner* — Noel Beharry
(74) *Attorney, Agent, or Firm* — Coats & Bennett, P.L.L.C.

(57) ABSTRACT

A media client for a networked communication device includes a user agent to communicate with a multimedia application in the networked communication device. The user agent provides a high-level application interface to the multimedia application. A signaling agent under the control of the user agent performs signaling operations necessary to establish and maintain communication sessions. A media agent under the control of the user agent performs media operations. The media client may be located in a network and remotely accessed by the multimedia application. The user agent, signaling agent and media agent have network interfaces that allow these elements to be distributed within the network and accessed remotely.

12 Claims, 12 Drawing Sheets

MEDIA CLIENT ARCHITECTURE FOR NETWORKED COMMUNICATION DEVICES

RELATED APPLICATIONS

This application claims priority to Provisional U.S. Patent Application No. 60/640,583 filed Dec. 31, 2004, which is incorporated herein by reference.

BACKGROUND OF THE INVENTION

Cellular telephone networks were originally developed to provide primarily voice services over circuit-switched networks. Although circuit-switched networks are still in widespread use, the current trend is toward packet switched networks that provide not only voice services, but also high-speed packet data services, that enable mobile users to surf the web, read email, download video and audio files, and do many other things that Internet users can do on fixed networks. However, real-time multimedia remains a problem in mobile networks because most packet data services are provided by best effort networks that lack quality of service guarantees needed for real-time multimedia services. Also, due to lack of standardization, network operators are often limited to offering only those IP services that their equipment vendors support. Lack of standardization also makes it difficult for network operators to purchase bundled services from third party developers.

The IP multimedia subsystem (IMS) was developed to provide a common, standardized architecture and standardized interfaces for providing IP services in a mobile networking environment. The IMS network is not dependent on the access technology and will interoperate with virtually any packet-switched network, including UMTS, cdma2000, GPRS and EDGE networks. IMS uses the session initiation protocol (SIP) as the service control protocol, which allows operators to offer multiple applications simultaneously. The IMS standard will speed the adoption of IP services on mobile terminals, allowing users to communicate via voice, video, or text using a single client on the mobile terminal.

Although IMS promises a richer experience to mobile subscribers, network operators are hesitant to invest in equipment to implement IMS until there are a sufficient number of subscribers with IMS capability to make the investment worthwhile. Most cellular telephones currently in use lack IMS capabilities, so the pool of potential subscribers for IMS services is relatively small. Extending IMS capabilities to legacy mobile terminals that lack inherent IMS capabilities would provide a much broader market for network operators and encourage investment in IMS technology and equipment.

SUMMARY OF THE INVENTION

The present invention relates to a network-centric media client that provides SIP and/or IMS capabilities to mobile terminal users. The media client may be incorporated within the mobile terminal, or may be located in a mobile network and accessed remotely by the mobile terminal. The remote access capability allows IMS services to be provided to legacy mobile terminals that lack inherent IMS capabilities.

The media client includes a user agent that communicates with a multimedia application over a first network interface, a signaling agent that communicates with the user agent over a second network interface, and a media agent that communicates with the user agent over a third network interface. The network interfaces enable local and/or remote access. The user agent provides a high-level application interface to the multimedia application that insulates the multimedia application from the details of the underlying network protocols. The media client may also include a JAVA application interface. The signaling agent operates under the direction of the user agent and performs signaling tasks necessary for establishing, modifying, and terminating communication sessions for media transfers. The media agent operates under the control of the user agent and performs media operations, such as managing media connections and routing media to appropriate rendering devices. The user agent, signaling agent, and media agent may be co-located within the network or may be distributed among network components.

The present invention is also applicable to fixed networked communication devices, such as DVD and CD players, digital video recorders, video cameras, digital still cameras, scanners, home stereo systems, television systems and computers, to enable media sessions between networked communication devices via a communication network. The present invention may also be used to remotely control a networked communication device.

DETAILED DESCRIPTION OF THE INVENTION

Figure 1:
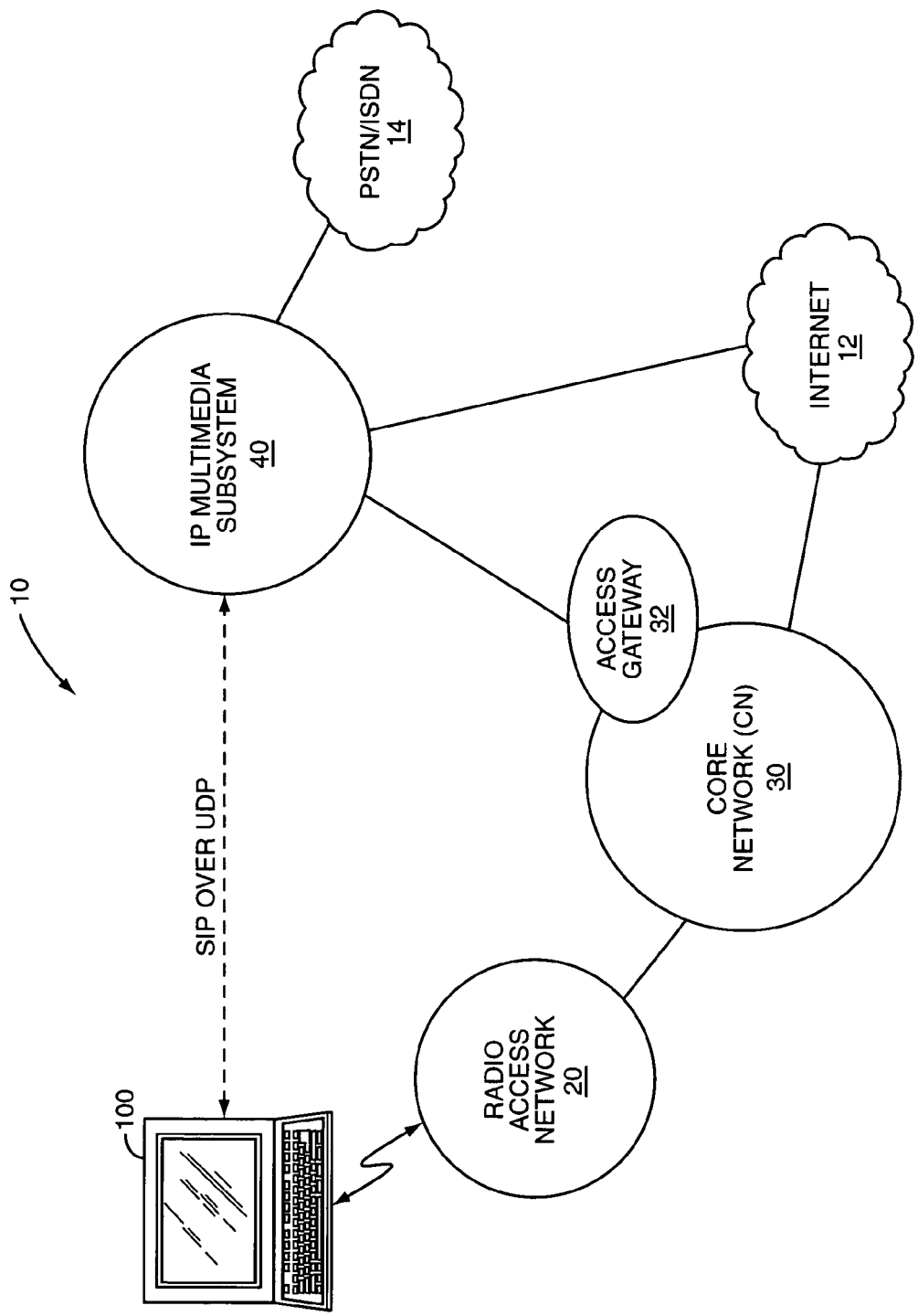
FIG. 1 is a functional block diagram of a wireless communication network in which the media client of the present invention may be used.

FIG. 1 illustrates a mobile communication network 10 in which the present invention may be employed. While the present invention is described in the context of a mobile communication network 10, those skilled in the art will appreciate that the present invention may also be used in fixed networks for communications between fixed networked communication devices. The term networked communication devices as used herein includes any devices capable of communicating over a network, such as the Internet.

The mobile communication network 10 comprises a radio access network (RAN) 20, a core network (CN) 30, and an IP Multimedia Subsystem (IMS) 40. The RAN 20 supports radio communications with mobile terminals 100 over an air interface. A mobile terminal 100 is a networked communication device as that term is used herein. The mobile communication network 10 typically includes more than one RAN 20 though only one is shown in FIG. 1. The CN 30 provides a connection to the Internet 12 or other packet data network (PDN) for packet switched services such as web browsing and email, and may provide a connection to the Public Switched Telephone Network (PSTN) 14 and/or the Integrated Digital Services Network (ISDN) 16 for circuit-switched services such as voice and fax services. The CN 30 may, for example, comprise a General Packet Radio Services (GPRS) network, cdma2000 network or UMTS network. The CN 30 includes an access gateway 32 for interconnecting with the IMS 40. The access gateway 32 may comprise a GPRS Gateway Serving Node (GGSN) for GPRS networks or a Packet Data Serving Node (PDSN) for cdma2000 networks. The IMS 40 provides access independent, IP-based multi-media services to mobile terminals 100 and supports a variety of IP services including voice over IP (VoIP), video and audio streaming, email, web browsing, videoconferencing, instant messaging, presence and other services.

The IMS 40 uses open interfaces and an access independent session control protocol (SCP), such as the Session Initiation Protocol (SIP), to support multi-media applications. Session description protocol (SDP) is used for media negotiation. SDP is described in IETF RFCs 2327 and 3264. SIP is a session control protocol for establishing, modifying and terminating communication sessions between one or more participants. These sessions may include, for example, Internet multimedia conferences, Internet telephony calls, and multimedia distributions. SIP is described in the IETF document RFC 3261. While a preferred embodiment of the invention as described herein uses the SIP, those skilled in the art will appreciate that the present invention may use other SCPs as well. Another well-known protocol comparable to the SIP is H.323. The details of the SIP are not material to the present invention, but a brief overview of the SIP is given below to better place the invention in context.

SIP is a signaling protocol that uses ASCII-based signaling messages to establish a communication session between two or more participants. Users are identified by a unique address referred to herein as the SIP address. Users register with a registrar server using their assigned SIP addresses. The registrar server provides this address to a location server upon request.

When a user initiates a call, a SIP request is sent to a SIP server (either a proxy server or a redirect server). The request includes the calling party address and called party address in a message header. If a proxy server receives the SIP request, it forwards the SIP request to the called party. The called party may be another user or may be an application server in the user's home network. The called party responds to the proxy server, which in turn, forwards the response to the calling party. The calling party acknowledges the response and a session is then established between the calling party and the called party. Real-time Transfer Protocol (RTP) described in IETF RFC or the Message Session Relay Protocol (MSRP) described in IETF RFC is used for the communication between the calling party and the called party.

If a redirect server receives the SIP request, the redirect server contacts the location server to determine the path to the called party, and then sends that information to the calling party. The calling party acknowledges receipt of the information and then resends the SIP request to the server identified in the redirection information (which could be the called party of a proxy server). When the SIP request reaches the called party, the called party responds and the calling party acknowledges the response. Communications then begin using RTP or MSRP. SIP is used only to process signaling messages related to call control and session management.

As described above, SIP enables applications within the mobile communication network 10 to establish a communications session. The applications may reside in a mobile terminal 100 or in an application server in the IMS 40. Additionally, the applications may reside in different networks 10.

Figure 2:
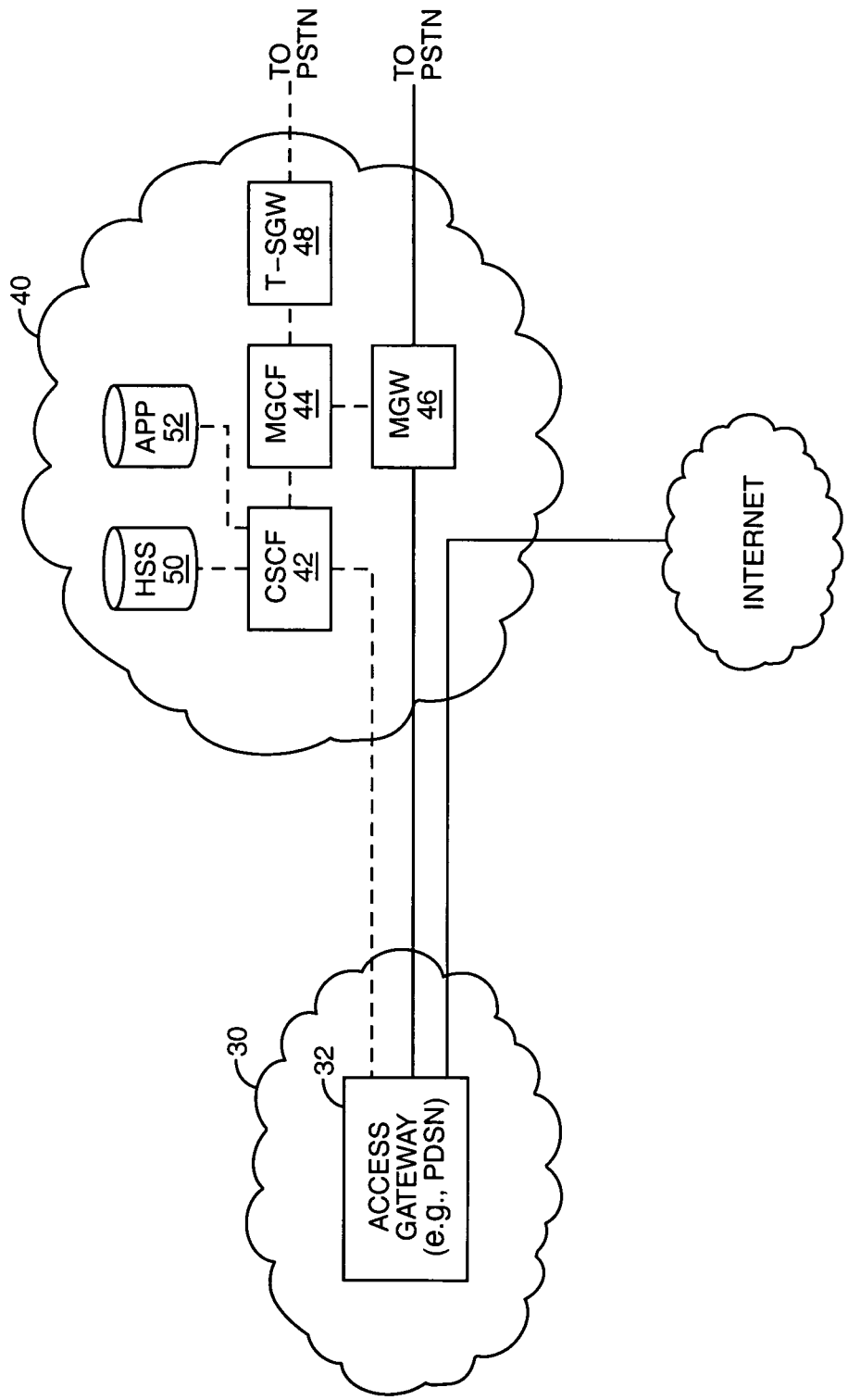
FIG. 2 is a block diagram illustrating the basic components of the IP multimedia subsystem (IMS) in the mobile communication network.

FIG. 2 illustrates the basic elements of the IMS 40 and its relationship to the CN 30. The IMS 40 includes one or more Call State Control Functions (CSCFs) 42, a Media Gateway Control Function (MGCF) 44, a Media Gateway (MGW) 46, a Transport Signaling Gateway (T-SGW) 48, and a Home Subscriber Server (HSS) 50, which are interconnected by an IP network. The IMS 40 may further include an application server 52 providing multimedia services to mobile terminals 100. The CSCFs 42 function as SIP servers to process session control signaling used to establish, modify and terminate a communication session. Functions performed by the CSCFs 42 include call control, address translation, authentication, capability negotiation, and subscriber profile management. The HSS 50 interfaces with the CSCFs 42 to provide information about the subscriber's current location and subscription information. The application server 50 provides multimedia services or other IP services to mobile terminals 100. The MGCF 44, MGW 46 and T-SGW 48 support interworking with external networks, such as the PSTN or ISDN. The MGCF 44 controls one or more MGWs 46 that manage the connections between the external network and the IMS 40. The MGCF 44 configures the MGW 46 and converts SIP messages into a different format, such as ISDN User Part (ISUP) messages. The MGCF 44 forwards the converted messages to the T-SGW 48, which interfaces the IMS 40 to external signaling network, such as the SS7 network. The T-SGW 48 includes a protocol converter to convert IP messages to SS7 and vice versa. The IMS 40 may include additional elements, which are not shown in FIG. 2 and are not important to understand the present invention.

Figure 3:
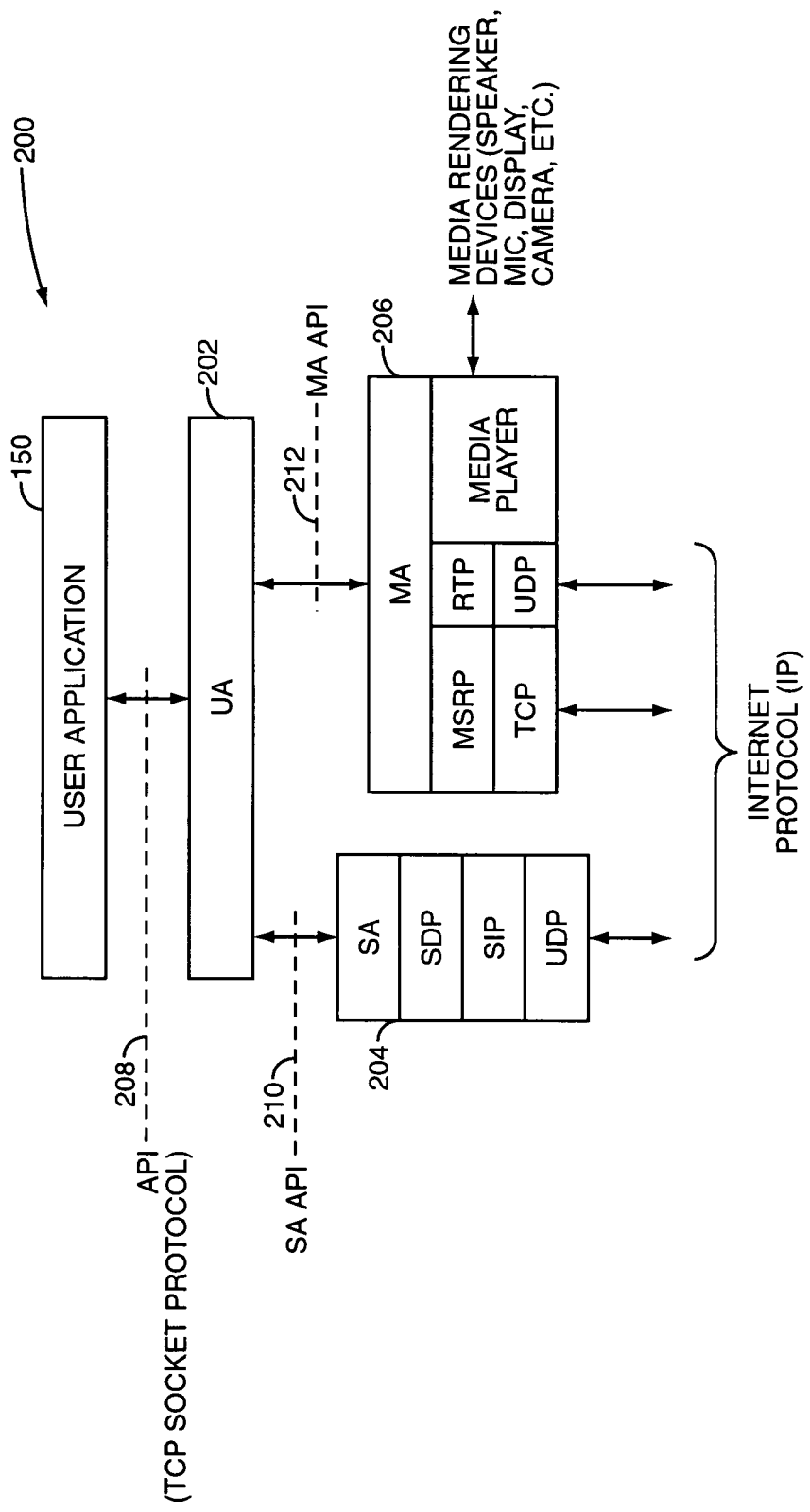
FIG. 3 illustrates the architecture of the media client according to the present invention.

The present invention provides a media client 200 shown in FIG. 3 for mobile terminals 100 to provide SIP and IMS capabilities to the mobile terminals 100. The media client 200 can communicate with the IMS 40 in the mobile communication network 10 to provide IP services to the mobile terminal 100. Additionally, the media client 200 can communicate directly with other network devices over a communication network, such as the Internet. Examples of services that may be offered include Push-to-Talk over Cellular (PoC), presence and Instant Messaging (IM), video and audio streaming, voice over IP, videoconferencing, interactive gaming, whiteboarding and content sharing. The media client 200 communicates with a user application 150 and provides a high level application interface that insulates the user application 150 from the details of the underlying network protocols. Media connections appear to the user application 150 as simple data streams, a/k/a pipes, that can be manipulated with a simple open, closed, read, and write commands.

FIG. 3 illustrates the basic architecture of the media client 200. The media client 200 comprises a user agent (UA) 202, a signaling agent (SA) 204, and a media agent (MA 206) 206. The UA 202 communicates with the user application 150 and translates application commands into appropriate signaling and media operations. The SA 204 and MA 206 operate under the control and direction of the UA 202. The UA 202 has overall control over connection management, and delegates signaling and media management tasks to the SA 204 and MA 206, respectively. In the illustrated embodiment, the SA 204 implements SIP and SDP protocols to handle signaling tasks. The SA 204 uses UDP over IP for transport of messages. Other session control protocols, such as H.323 could also be used. The signaling tasks include setting up, modifying, and tearing down communication sessions, negotiating session parameters, interrogating remote devices to determine capabilities, and presence detection. The MA 206 implements the message session relay protocol (MSRP) and the Real-Time Transport Protocol (RTP) and includes one or more media players to process and output media to media rendering devices. The MA 206 manages media connections, routes media according to media type and user settings, and invokes media players to process media as required. The MA 206 uses TCP and/or UDP over IP for transport of RTP and MSRP messages.

In some realizations, a monolithic approach may be taken, integrating the UA 202, SA 204, and MA 206 together in a single application. In the embodiment shown in FIG. 3, network interfaces 208, 210 and 212 between the UA 202, SA 204 and MA 206 enable implementations where the UA 202, SA 204 and MA 206 may be separate applications distributed within the mobile communication network 10. The interfaces 208, 210, 212 may use a TCP socket connection or other type of network interface allowing the UA 202, SA 204 and/or MA 206 to be remotely located from the user application 150.

The distributed approach has several advantages over the monolithic approach. The media client 200 may be located in a network server in the IMS 40 or other IP network and remotely accessed by a mobile terminal 100 using, for example, telnet to open a socket connection. Thus, IMS services can be provided to mobile terminals 100 that do not have inherent IMS capabilities. The separation of the UA 202, SA 204, and MA 206 allow these elements to be distributed within the network 10 so that the UA 202, SA 204, and MA 206 can reside in different locations within the network 10. By locating the media client 200 in a network with low bandwidth or high latency, improved performance may be realized because the high level API for the media client 200 reduces the amount of signaling over the air interface. Further, the SA 204 and MA 206, which generate the majority of the signaling, can be located closer to the network backbone. The separation of the SA 204 and MA 206 also allows for optimized implementations of stand-alone media (e.g., TV) and control (e.g., remote control) devices.

Figure 4:
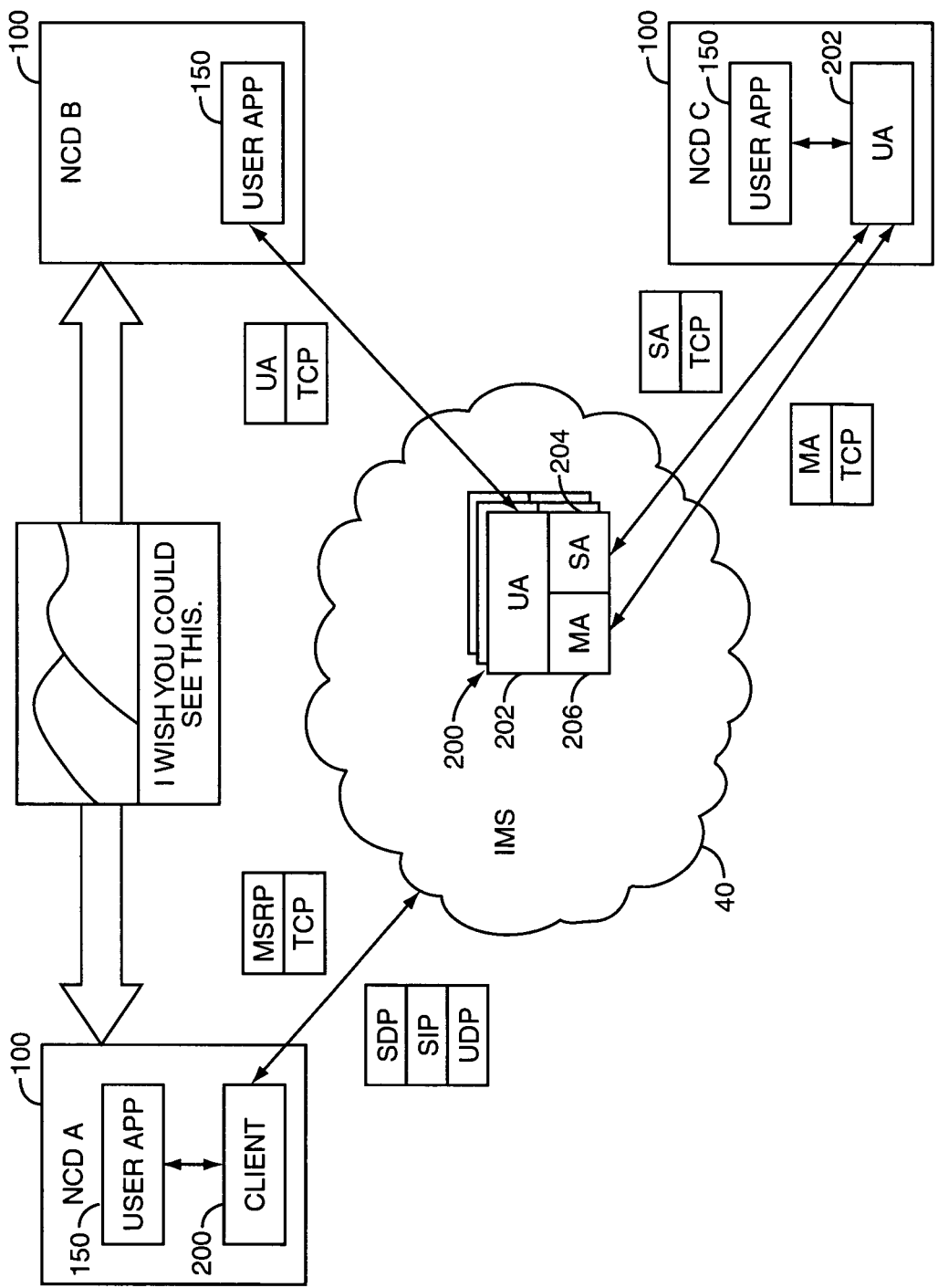
FIG. 4 illustrates various methods of implementing the media client.

FIG. 4 illustrates some possible arrangements of the media client 200. In FIG. 4, NCD A and NCD B have established a multimedia communication session across the communication network. NCD A incorporates a fully functional media client 200 that communicates with a user application 150 in the NCD 100. NCD B lacks inherent IMS capabilities and uses the services of a remote media client 200 located within the network 10. In this case, a user application 150 residing in NCD B can communicate with a media client 200 residing in a network server over a TCP socket connection, e.g. telnet. The media client 200 in the network provides the same functionality to NCD B as the media client 200 residing in NCD A. The ability to remotely access the media client 200 makes it possible to extend IMS services to legacy mobile terminals, which in turn provides the critical mass necessary to make investment in IMS technology worthwhile to network operators. NCD C incorporates a UA 202 that communicates with a user application in the networked communication device 100, and with an SA 204 and MA 206 located in the network.

The media client 200 is implemented as a process running on a host device, such as a PC or mobile terminal 100. The host device includes memory in which to store code implementing the present invention, one or more microprocessors to execute the code, and a communications interface providing network access. The UA 202, SA 204, and MA 206 may reside in different hosts. After it boots up, the media client 200 opens a server socket on a designated port, e.g., port 3500 for communications between the UA 202 and the user application 150. Any user application 150 wishing to communicate with the media client 200 can open a client socket on the same port. The port for communications between the UA 202 and the user application 150 may be specified in a configuration file. Different ports may be opened for communications between the UA 202 and the SA 204, or between the UA 202 and MA 206.

In one exemplary embodiment, the media client 200 uses a text-based interface protocol (the UA API) for communications between the user application 150 and the media client 200. All communications between the user application 150 and media client 200 are by text strings read and written to the TCP socket. The IMS protocol uses two types of messages for communications—requests and responses. The user application 150 typically sends requests to the UA 202 to initiate a transaction, though the UA 202 can also send requests to the user application 150. Requests typically have parameters, which are separated by spaces. The UA 202 typically sends responses to the client in response to requests. There are two kinds of responses, provisional and final. Provisional responses do not end the transaction initiated by the corresponding request. Final responses terminate the transaction.

The application interface between the UA 202 and the SA 204 (the SA API) and the application interface between the UA 202 and the MA 206 (the MA API) also use text-based interface protocols similar to the UA API. Requests from the UA 202 requiring action by either the SA 204 or the MA 206 start a transaction between the UA 202 and the SA 204 or MA 206. Table 1 in Appendix A documents exemplary requests and responses for the UA API. Table 2 in Appendix B documents exemplary requests and responses for the SA API. Table 3 in Appendix C documents exemplary requests and responses for the MA API.

The main requests in the UA API are the REGISTER request, the CALL request, the MSG request, the ACCEPT request, the HANG-UP request, the SUBSCRIBE request, the NOTIFY event, and the PUBLISH request. The REGISTER request, SUBSCRIBE request, NOTIFY request and PUBLISH request correspond to standard SIP requests, but provide a higher level of abstraction for the user application 150.

Figure 5:
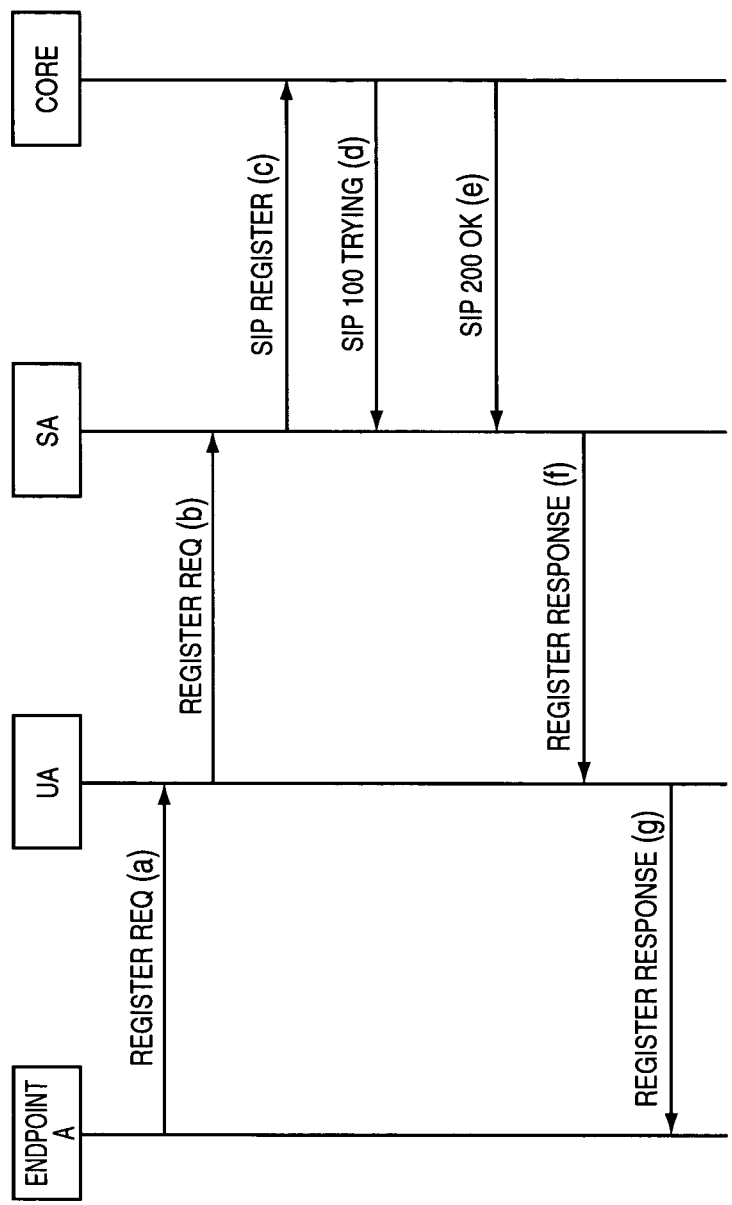
FIG. 5 is a call flow diagram illustrating a SIP registration procedure.

The REGISTER request is sent by the user application 150 to the media client 200 to register with a SIP registrar. A typical REGISTER request is in the form "register aol.com" or "register msn.com: 5050." In response to the REGISTER request, the UA 202 instructs the SA 204 to perform a SIP registration. After registering with the SIP registrar, the SA 204 sends a message to the UA 202 indicating the status of the registration attempt, e.g., successful or failed. An exemplary REGISTER response is "register 200:OK" if the registration is successful, and "register 1xx:failed" if the registration is not successful. FIG. 5, which is described in more detail below, illustrates the signal flow for a registration procedure.

The CALL request is sent by the user application 150 to the UA 202 to connect with a remote device. The CALL request is used to initiate a RTP or MSRP session. The CALL request includes information identifying the called party and the call type, such as a user ID, alias, or fully qualified network address. If a proxy is involved, the CALL request may specify the user ID of the called party. If a proxy is not involved, the CALL request may give the fully qualified address and port of the remote host to connect to. The call type may comprise, for example, the mime type and sub-type, e.g. video/h263 or audio/amr. The CALL request typically takes the form "call alice video/h263" or "call alice@ims.net: 5060 video/h263" or "call 10.0.0.1:5060 video/h263." More than one call type may be included in a single CALL request. Depending on the outcome of the CALL request, the UA 202 sends a CALL response indicating the outcome or status of the CALL request. An exemplary CALL response is "call connected" if the connection is "successfully established" or "call failed" if the connection was not successful. The CALL response may optionally include a status code providing additional information, such as an error code indicating why call request was unsuccessful. If the connection succeeds, the user application 150 can begin sending and receiving media and/or messages over the RTP or MSRP connection.

A CALL request may also be sent by the UA 202 to the user application 150 in the case of an incoming call. In this case, the CALL request includes information identifying the calling party rather than the called party. Otherwise, the CALL request is the same. The information identifying the calling party may comprise a user ID of the called party or a fully qualified address for a remote host. When a CALL request is sent from the UA 202 to the user application 150, the user application 150 does not send a CALL response. Instead, the user application 150 sends an ACCEPT request that terminates the CALL request.

The ACCEPT request is sent by the user application 150 responsive to a CALL request to instruct the UA 202 to either accept or reject an incoming call. The ACCEPT request includes a command indicating that the UA 202 should either accept or reject the call and optionally a code indicating, for example, why a call is rejected. If more than one call type is specified in the CALL request, the user application 150 may accept a subset and reject the rest. To accept less than all of the specified call types, the user application includes a list of the accepted call types in the ACCEPT request. The UA 202 should accept those listed and reject the rest. If no call type is specified in the ACCEPT request, the UA 202 by default may accept all call types specified in the CALL request. A typical ACCEPT request is in the form "accept yes" to accept the call or "accept no" to reject the call. If less than all specified call types are accepted, the ACCEPT request has the form "accept OK audio/amr", which specifies the accepted call types.

Depending on whether the connection is successfully made, the UA 202 sends an ACCEPT response to the user application 150. The ACCEPT response includes a status message indicating whether the connection was successfully made and optionally a status code. A typical ACCEPT response has the form "accept OK" or "ACCEPT Failed:1xx."

The MSG request is sent by the user application 150 to the media client 200 to request transmission of messages. The MSG request includes a call ID or session ID identifying the call in which the message is to be sent, the message length, the message type, and the message data. For text messages, the MSG request is of the form "msg xxx nnn text/plain\n this is the text" where xxx is the call ID or session ID and nnn is the length of the text only (not including the new line or header). The new line character separates the message type from the message data. An example of a text message sent using the MSG request is "msg 111 5 text/plain\n hello." For binary data, the MSG request is of the form "msg xxx nnn mime/type\n" where xxx is the call ID and nnn is the length of the data buffer. An example of a binary message is "msg 111 43 image/jpg\n31290759 . . . 93285." The UA 202 sends a MSG response to the user application 150 to indicate successful delivery or failure of the MSG request. An exemplary MSG response is in the form "MSG OK," if the message is success- fully delivered and "MSG Failed:1xx" if the message is not successfully delivered.

The HANGUP request is used to terminate a connection. The HANGUP request can be sent by the user application 150 to the media client 200 or vice versa. The HANGUP request may comprise the single term "hang-up" or single letter "h" and the call ID assigned to the call being ended. An exemplary HANGUP request is in the form "hangup xxx" where xxx is the call ID. When the HANGUP request is sent by the user application 150 to the UA 202, the UA 202 sends a HANGUP response to confirm that the call is ended. The HANGUP response may be in the form "hangup OK" or "hangup disconnected."

The SUBSCRIBE request is sent by the user application 150 to the UA 202 to subscribe to a presence service or other notification service. The SUBSCRIBE request includes an address for the subscription service, the expiration time for the subscribe request, and the event to which the subscribe request pertains. The typical form of the SUBSCRIBE request is "subscribe someone@domain.com:3600 ttt presence" or "subscribe someone at his domain.com:3600 ttt presence autofresh" where m represents the expiration time in seconds of the subscribe request. In response to the SUBSCRIBE request, the UA 202 instructs the SA 204 to perform a SIP subscription procedure. After the SIP subscription procedure is successfully completed, the SA 204 notifies the UA 202, which in turn notifies the user application 150 by sending a SUBSCRIBE response. The SUBSCRIBE response includes an address for the subscription service, the expiration time in seconds of the subscription, and a status message. The expiration time may be different than requested. The SUBSCRIBE request may optionally include a status code and an "autorefresh" command to automatically refresh the SUBSCRIBE request when it expires. It is possible for the SUBSCRIBE request to fail because of a redirect request. In this case, the SUBSCRIBE response may return a new address and the UA 202 may re-subscribe using the new address. The SUBSCRIBE response is in the form "subscribe ttt me@mydomain.com:3600 successful:200" if the subscription is successfully executed and "subscribe ttt me@mydomain.com 3600 failed:481" if the subscription fails.

The NOTIFY request is sent from the UA 202 to the user application 150 to notify the user application 150 of a change in the presence status of a presence entity giving presence notification to the user application 150. The NOTIFY request includes the message size, the type of event that triggered the NOTIFY, the mime type of the message body, and the message data. The typical form of the NOTIFY request is "notify 30 someone@hisdomain.com presence application/pidf+xml\alice is now available." The user application 150 responds with "Notify OK" to acknowledge the NOTIFY request.

The PUBLISH request is used for presence services and other notification services. The PUBLISH request is sent by the user application 150 to the media client 200 to notify the presence server when the presence state of the user changes. The PUBLISH request includes the address of the presence server and the expiration time for the PUBLISH request. The PUBLISH request may optionally include an "autorefresh" command to automatically refresh the PUBLISH request when it expires. A typical PUBLISH request takes the form "publish ttt me@mydomain.com 3600." The UA 202 responds to the user application 150 with "publish ttt me@mydomain.com 3600 successful:200" if the publication is successful and with "publish ttt me@mydomain.com 3600 failed:481" if the publication fails.

Table 2 in Appendix B describes requests and responses used in the SA API. The main requests include the REGIS- TER request, the INVITE request, the ACK request, the SUBSCRIBE request, the NOTIFY request, the PUBLISH request, and the BYE request, which correspond to standard SIP requests. The REGISTER request is used to register with a SIP registrar. The INVITE and ACK requests are used to establish a SIP session. The SUBSCRIBE, NOTIFY and PUBLISH requests are used to implement presence services or other notification services. The BYE request is used to terminate a SIP session. Some requests used in the SA API correspond to common SIP requests and use the same names. It should be apparent from the context which request is being referred to. However, to avoid confusion, the prefix SIP is used to identify standard SIP requests and responses sent to/from the SA 204.

The REGISTER request is sent from the UA 202 to the SA 204 responsive to a corresponding REGISTER request from the user application 150. The REGISTER request includes the network address and optionally a port of the SIP registrar or a SIP proxy. The REGISTER request is in the form "register server@network.com." The SA 204, responsive to the REGISTER request, attempts registration with a SIP registrar according to SIP as described in IETF RFC 3261. The SA 204 sends a REGISTER response to the UA 202 indicating the status of the REGISTER request. An exemplary REGISTER response is in the form "register OK" if the registration attempt is successful, or "register failed" if the registration attempt is unsuccessful.

The INVITE request is sent by the UA 202 to the SA 204 responsive to a CALL request from the user application 150 at the originating end of a call. The SA INVITE request includes the address of the called party or a user ID that can be resolved to a valid address, the call type specifying the type of call to be established, and the host address used for the media session for each call type specified. The same host address may be used for each call type or different addresses may be used. An exemplary INVITE request is in the form "invite alice@domain.com video/h263 me@mydomain.com:xxx audio/amr me@mydomain.com:xxx, where xxx indicates port number. After sending the INVITE request, the UA 202 waits for a response from the SA 204. The SA 204, responsive to the INVITE request, sends a SIP INVITE request to the called party specified in the INVITE request and waits for a response. If a connection is successfully established, the SA 204 sends an INVITE response to the UA 202 indicating that the invitation is accepted. The INVITE response includes a session identifier, referred to herein as the call ID.

An INVITE request may also be sent by the SA 204 to the UA 202 responsive to receipt of a SIP INVITE at the receiving end of a call. In this case, the INVITE request includes the address of the calling party used for signaling, and the address or addresses used by the calling party for the media session. The INVITE response from the UA 202 to the SA 204 is the same as described above, except that the session identifier is not included. In this case, the session identifier is sent in an ACK request from the SA 204 to the UA 202 after the SA 204 receives a SIP ACK from the calling party.

The SUBSCRIBE request is sent by the UA 202 to the SA 204 to initiate subscription to a presence service or other notification service. The SUBSCRIBE request includes the address of the party from which the user wants to receive presence state information or of a presence server. The SA 204, upon receipt of the SUBSCRIBE request from the UA 202, sends a SIP SUBSCRIBE request to the host designated in the SA SUBSCRIBE request and waits for a response. The host to whom the SIP SUBSCRIBE request is sent returns a SIP NOTIFY request to the SA 204. The SIP NOTIFY request indicates whether the SIP SUBSCRIBE request was authorized, and, if so, includes the current presence state information. The SA 204 acknowledges the SIP NOTIFY request and sends a NOTIFY request to the UA 202 containing the presence state information of the presence agent. Until the subscription expires, the presence agent who authorized the subscription sends a SIP NOTIFY request each time the presence state information changes, and the SA 204 sends a corresponding NOTIFY request to the UA 202 to forward the presence information to the UA 202.

The PUBLISH request is sent by the UA 202 to the SA 204 to notify the presence server when there is a change in the presence state of the user. If the SA 204 is functioning as a presence server, the SA 204 sends a NOTIFY request to its subscribers to notify the subscribers of the change in presence state. If a separate presence server is used to distribute presence information, the SA 204 sends a corresponding SIP PUBLISH request to the presence server. After sending the SIP PUBLISH request, the SA 204 sends a PUBLISH response to the UA 202 indicating the status of the PUBLISH request.

The BYE request is sent by the UA 202 to the SA 204 or vice versa to terminate a SIP session. When the SA 204 receives the BYE request from the UA 204, it sends a SIP BYE request to the other party to terminate the session. Once the SIP BYE request is acknowledged, the SA 204 sends a BYE response to the UA 202 to acknowledge the BYE request. When the UA 202 receives a BYE request from the SA 204, it closes the connection opened for the call specified in the BYE request. In this case, no response to the BYE request is required because the BYE request is mandatory.

Table 3 in Appendix C describes the MA API. The main request in the MA API include the LISTEN request, the CONNECT request, the SEND request, the OPEN request, the PEER request, and the CLOSE request.

The LISTEN request is sent by the UA 202 to the MA 206 to initiate an MSRP session for multimedia messaging. The UA 202 sends the LISTEN request in response to a call request from the user application 150 requesting an MSRP session. The LISTEN request may optionally include the address of a remote host from which connections can be made. When the remote host is specified in the LISTEN request, connections will be accepted only from the specified host. In response to the LISTEN request, the MA 206 opens a port for a media connection and sends a LISTEN response to the UA 202 giving the address and port for the media connection.

The CONNECT request is sent by the UA 202 at the receiving end of a call to the MA 206 to establish a MSRP connection. The CONNECT request is typically sent after the user at the receiving end of a call accepts an invitation from the calling party to join a call. The CONNECT request includes the network address and port specified by the calling party in the SIP INVITE. An exemplary CONNECT request is in the form "connect anybody@domain.com." In response to the CONNECT request, the MA 206 establishes a connection according to MSRP and sends a CONNECT response to the UA 202. The CONNECT response includes the status of the CONNECT request and optionally a status code. An exemplary CONNECT response is in the form "connect OK" or "connect failed."

The SEND request is used to send multimedia messages once a MSRP session is established. When the UA 202 receives a MSG request from the media client 200, the UA 202 generates and sends a SEND request to the MA 206. The SEND request includes a call ID that uniquely identifies the call in which the message is being sent, the message length, the message type and the message data. An exemplary SEND request is in the form "send xxx nnn text/plain\n this is the text." The MA 206 in turn sends the message according to the MSRP. When the message is acknowledged, the MA 206 sends a SEND response to the UA 202 identifying the call and indicating the status of the SEND request. The SEND request may optionally include a status code. An exemplary SEND response is in the form "send xxx OK" indicating successful delivery or "send xxx failed" indicating that the message was not successfully delivered.

The OPEN request is used to initiate an RTP session. The UA 202 sends an OPEN request to the MA 206 responsive to an ACCEPT request from the user application 150. The OPEN request optionally includes a network address of a remote host from which media connections will be accepted. If the remote host address is include in the OPEN request, media connections will be accepted only from the address specified in the OPEN request. In response to the OPEN request, the MA 206 opens a port for a media connection and returns an OPEN response indicating the network address and port for the media connection. The OPEN response indicates the status of the OPEN request and, if successful, includes the network address of the host and port opened for the RTP connection.

Once the media connection is established, the UA 202 at the originating end of a call sends a PEER request to the MA 206 to provide the MA 206 with the host address and port opened for the RTP session at other end. The only parameter for the PEER request is the network address and port for the media connection. No response to the PEER address request is required. An exemplary PEER request is in the form "peer someone@domain.com."

The CLOSE request is used to terminate a media connection used for either RTP or MSRP sessions. The UA 202 sends the CLOSE request to the MA 206 responsive to a HANG-UP request from the user application 150.

The UA, SA and MA APIs may also have a SET request to enable certain parameters to be pre-configured during initialization. The SET request includes the parameter name and the value assigned to the named parameter. The SET request can be used to configure user-specific settings such as a username, alias, contact address, and default sources and sinks for different media.

Figure 6:
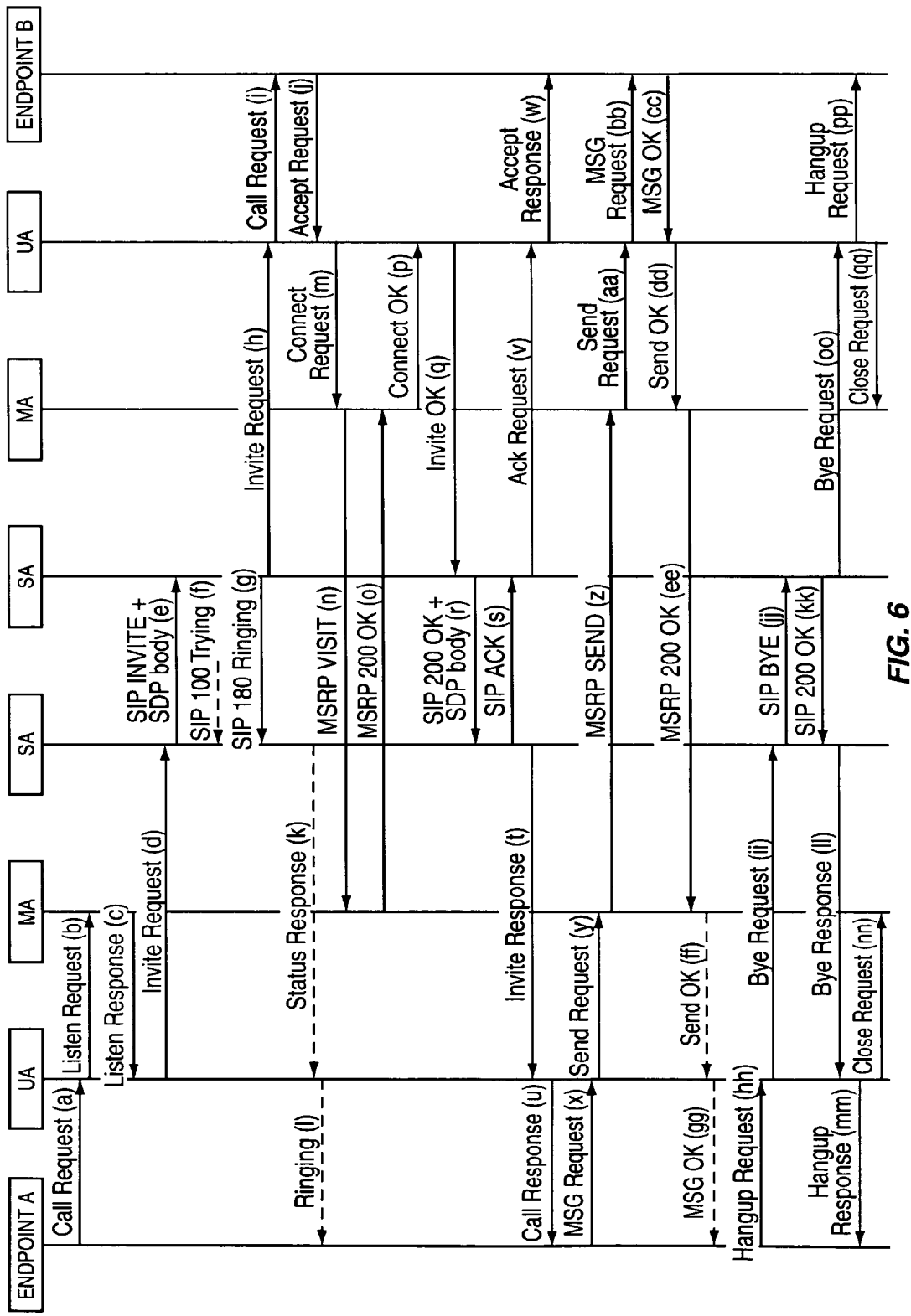
FIG. 6 is a call flow diagram illustrating a MSRP session.
Figure 7:
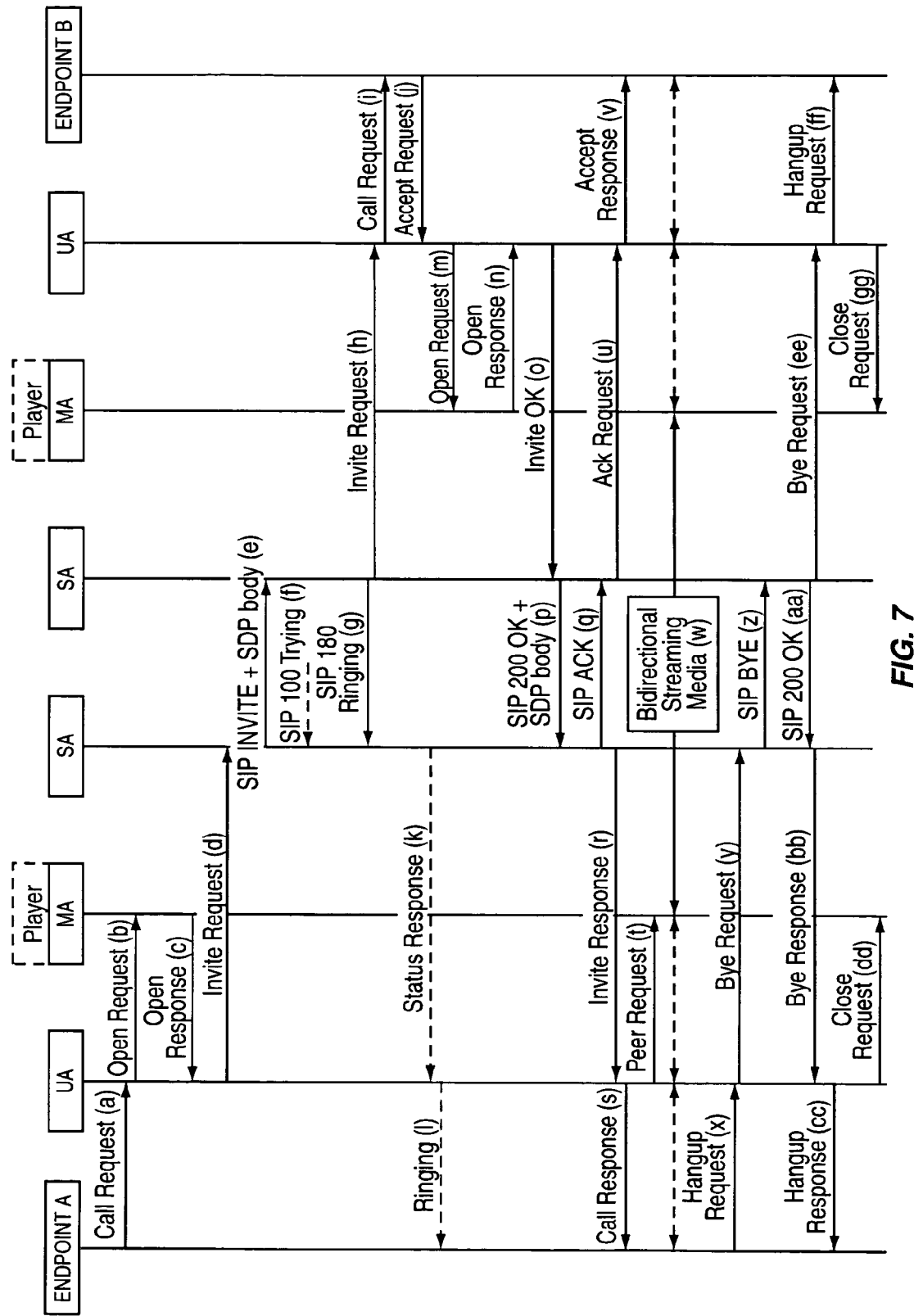
FIG. 7 is a call flow diagram illustrating a RTP session.

FIGS. 5 through 7 are call flow diagrams illustrating how the IMS commands and responses are used by a multimedia application. FIG. 5 illustrates a typical SIP registration procedure. FIG. 6 is a call flow diagram illustrating an exemplary MSRP session. FIG. 7 is a call flow diagram illustrating an exemplary RTP session.

FIG. 5 is a call flow diagram illustrating a SIP registration procedure. In FIG. 5, User A is registering with a SIP registrar. The user application 150 for User A sends a REGISTER request to the UA 202 (a) using the API shown in Table 1. The UA 202 receives the request, appends user-specific configuration data, and forwards the REGISTER request to the SA 204. The user-specific configuration data may include data such as the username, alias, and contact address. In response to the REGISTER request, the SA 204 initiates a SIP registration procedure. The SA 204 constructs a SIP REGISTER request from the information received from the UA 202, augmenting this information with default settings as required for a complete SIP request. The SA 204 sends the SIP REGISTER request to a SIP registrar (c). The IMS core 40 may return a provisional SIP response (SIP 100 Trying) to the SA 204 (d) to prevent unnecessary SIP request retransmission. Therefore, no action is required by the SA 204. If the registration is successful, the SIP registrar sends a SIP response (SIP 200 OK) to the SIP proxy (f) and the SIP proxy relays the SIP registrar's response to the SA 204 (g). The SA 204 sends a SA response to the user agent (h) which notifies the user application 150 that the registration was successful. User A is now able to send and receive SIP messages using its registered ID.

FIG. 6 illustrates a call flow in a typical MSRP session between two users. An MSRP session is a context in which a series of messages may be exchanged using SEND requests. The MSRP provides end-to-end transport of messages in session-mode over a reliable transport protocol, such as TCP. MSRP sessions are established using the SDP offer answer model (IETF RFC 3264) with SIP as a message carrier. To briefly summarize, endpoint A can initiate a communication session with endpoint B by sending an offer message (SIP INVITE) with a temporary address representative of the endpoint A. If endpoint B wishes to join the session, it opens a TCP connection to endpoint A and sends a MSRP VISIT request addressed to the address provided by endpoint A. After visiting the session, endpoint B sends an answer to the SIP INVITE request. The answer contains the address of endpoint B used for the communication session. After this exchange, endpoints A and B can exchange messages. Messages are sent with a SEND request and the receiving endpoint responds with an OK reply. Endpoints A and B send messages over a TCP connection established by the MSRP VISIT request to the address indicated in the In the SIP INVITE SDP body.

The present invention insulates the user applications at endpoints A and B from the details of the MSRP, SIP, and SDP, which are handled by the UA 202, SA 204 and MA 206 as shown in FIG. 6. The procedure illustrated in FIG. 6 uses the APIs defined in Tables 1-3 in the Appendix. User application 150 initiates the MSRP session by sending a CALL request to the media client 200 (a). In response to the CALL request, the UA 202 sends a MA LISTEN request (b) to the MA 206 instructing the MA 206 to open a TCP socket to accept a TCP connection from the peer specified in the CALL request. The MA 206 sends a MA LISTEN response (c) to the UA 202 including the network address of the host and the port opened for the media connection. The UA 202 then instructs the SA 204 to initiate the communication session by sending a SA INVITE request (d) to the SA 204. The SA INVITE request contains the parameters including in the CALL request and the network address and port provided by the MA 206 for the media connection. The SA INVITE could optionally include user-specific configuration data such as username, alias, etc. Parameter values for user specified configuration data can also be set by the user application 150 using the SET request shown in Table 1.

The SA 204 uses conventional SIP signaling to establish the MSRP session. The SA 204 constructs a SIP INVITE request from the information it receives from the UA 202 augmenting this information with default settings as required for a complete SIP INVITE request. The SA 204 sends the SIP INVITE request (e) to endpoint B. The SIP INVITE request includes an SDP (Session Description Protocol) body to describe the multimedia session. While waiting for a response from the SA 204 at endpoint B, the SA 204 at endpoint A may receive a provisional SIP response ("100 trying")(f) from the network indicating that the network is attempting to establish a connection with endpoint B.

Once the SIP INVITE request is received by the SA 204 at endpoint B, it sends a SA INVITE request to the UA 202 (h) and may send a provisional response (g) to the SA 204 at endpoint A indicating that the SA 204 is "ringing" the user at endpoint B. The SA 204 at endpoint A, in turn, may send provisional STATUS response (k) to the UA 202 to provide a ring indication to the UA 202 at endpoint A. The UA 202 at endpoint A may, in some applications, provide the provisional status information to the user application 150 (l) to notify the user that an attempt is being made to reach the user at endpoint B.

Responsive to the INVITE request, the UA 202 at endpoint B sends a CALL request (i) to the user application 150 to notify the user application 150 that an invitation to a MSRP session was received. The CALL request includes information that identifies the calling party and the type of call. The user application 150 sends an ACCEPT request (j) in reply to the CALL request indicating whether the user wishes to answer the call. In this example, the user at endpoint B accepts the invitation. If the call involves more than one type of media, the user at endpoint B specifies which media to accept in the ACCEPT request. The UA 202 at endpoint B then sends a CONNECT request (m) to the MA 206 to open a media connection, e.g. TCP connection. The MA 206 at endpoint B sends an MSRP VISIT message (n) to the MA 206 at endpoint A to establish a MSRP connection. The MA 206 at endpoint A sends a positive response (MSRP 200 OK) to the MSRP VISIT to establish a MSRP connection between endpoints A and B (o). After the media connection is established, the MA 206 at endpoint B sends a CONNECT response (Connect 200 OK) to the UA 202 at endpoint B to indicate that a media connection was successfully established (p).

At this point the SIP INVITE request has not been accepted. The UA 202 at endpoint B sends a SA INVITE response (INVITE 200 OK) to the SA 204 at endpoint B indicating that the SA 204 should accept the invitation to join the MSRP session with endpoint A (q). The SA 204 at endpoint B sends a SIP INVITE response (SIP 200 OK+SDP body) to the SA 204 at endpoint A (r). The SIP INVITE response includes an SDP body confirming the MSRP session parameters. The SIP INVITE response is the answer to the SIP INVITE request at step (e) and contains the network address and port used by endpoint B for the media connection. The SA 204 at endpoint A acknowledges the SIP 200 OK response to complete the SIP handshake (s). At endpoint A, the SA 204 sends an SA INVITE response (t) indicating that the connection requested at step (a) was successfully established. This message includes a call identifier that uniquely identifies the call, and the network address of the host and port at endpoint B used for the media connection. The UA 202 at endpoint A in turn sends a CALL response (u) to the user application 150 indicating that the connection requested at step (a) was successfully established. At endpoint B, the SA 204 sends an ACK request (v) to the UA 202 responsive to the SIP ACK indicating that the connection with endpoint A was successful and including a SIP session identifier. The UA 202 in turn sends an ACCEPT response (w) to the user application 150 indicating establishment of a connection with endpoint A. The endpoints A and B can now begin sending and receiving messages.

The user application at endpoint A generates a multimedia message, which is passed to the UA 202 in a MSG request (x). The MSG request includes information identifying the session, the message type and the message size. The UA 202 constructs and forwards a SEND request (y) to the MA 206 with the parameters specified in the MSG request directing the MA 206 to forward the multimedia message to endpoint B. The MA 206 uses the MSRP protocol to deliver multimedia messages. The MA 206 generates a MSRP SEND request (z), supplying default parameters as need for a complete MSRP SEND request, and send the request to the MA 206 at endpoint B. The MA 206 at endpoint B extracts the message content from the MSRP SEND request and delivers the message to the UA 202 at endpoint B inside a MA SEND request (aa). The UA 202 at endpoint B uses the MSG request to forward the message content to the user application 150 (bb). The user application 150 at endpoint B acknowledges receipt of the message by sending a MSG response (MSG 200 OK) (cc) and the UA 202 in turns forwards a SEND response (dd) to the MA 206 indicating that the message was successfully delivered. The MA 206 sends an MSRP OK response (MSRP 200 OK) to acknowledge receipt of the message (ee). The MA 206 at endpoint A may optionally translate and forward the MSRP response (MA SEND 200 OK) to the UA 202 at endpoint A (ff), which in turn may optionally send a MSG response (MSG 200 OK) to the user application 150 at endpoint A indicating that the message was successfully delivered (gg).

To end the session, the user application 150 at endpoint A sends a HANG-UP request to its UA 202 (hh). Endpoint B could also end the session in the same manner. The UA 202 at endpoint A sends a SA BYE request (ii) to the SA 204 at endpoint B indicating that the call specified in the request should be ended. The SA 204 generates a SIP BYE request (r) based on the SIP session parameters established at step and sends this message to endpoint B. The SA 204 at endpoint B receives the SIP BYE request and replies to acknowledge receipt of the message (kk). At endpoint A, the SA 204 sends a BYE response (ll) to the UA 202 confirming that the media session is closed. The UA 202 sends a HANGUP response (mm) to the user application 150 to notify the user application 150 that the media session is closed, and sends a CLOSE request (nn) to the MA 206 to close the connection opened for the media session. The SA 204 at endpoint B generates a BYE request and forwards the BYE request to the UA 202 (oo) indicating that the MSRP session has been closed. Similarly, the UA 202 at endpoint B sends a HANGUP request (pp) to the user application 150 to notify the user application that the MSRP session is closed, and sends a CLOSE request to the MA 206 to close connection opened for the media session (qq).

FIG. 7 illustrates an exemplary RTP session between endpoints A and B. The procedure illustrated in FIG. 7 uses the APIs defined in Tables 1-3 in the Appendix. The user application 150 at endpoint A sends a CALL request (a) to the media client 200 to initiate the RTP session. The CALL request includes information identifying the called party and the type of the call. In response to the CALL request, the UA 202 at endpoint A sends a MA OPEN request (b) to the MA 206 instructing the MA 206 to open a UDP connection for a RTP session with the peer specified in the CALL request. The MA 206 opens a UDP socket and returns a MA Open response (c) to the UA 202 containing the network address and port of the UDP socket opened for the RTP session. The UA 202 at endpoint A then ends a SA INVITE request (d) to the SA 204. The SA INVITE request includes the parameters from the CALL request made at step (a), the connection information provided by the MA 206 at step (c) and optionally user-specified configuration data such as a username and alias. Parameter values for user specified configuration data can be set by the user application 150 using the SET request shown in Table 1.

The SA 204 uses conventional SIP signaling to establish the communication session with endpoint B. The SA 204 sends a SIP INVITE request to endpoint B (e). The SIP INVITE request includes an SDP body to describe the multimedia session. The SDP body describes the media comprising the session and codec parameters. While waiting for a response from the SA 204 at endpoint B, the SA 204 at endpoint A may receive a provisional response (f) from the network indicating that the network is attempting to establish a connection with endpoint B.

Once the SIP INVITE request is received by the SA 204 at endpoint B, it sends a SA INVITE request to the UA 202 (h) to the UA 202 to open an RTP connection and may send a provisional response to the SA 204 at endpoint A (g) indicating that the SA 204 is "ringing" the user at endpoint B. The SA 204 at endpoint A, in turn, may send provisional STATUS response to the UA 202 to provide a ring indication to the UA 202 at endpoint A (k). The UA 202 at endpoint A may, in some applications, provide the provisional status information to the user application 150 (l) to notify the user that an attempt is being made to ring the user at endpoint B.

The INVITE request at step (h) includes information identifying endpoint A and the media type(s) for the RTP session. The UA 202 notifies the user application 150 that an invitation to a RTP session was received by sending a CALL request (i). The user application 150 replies to the CALL request with an ACCEPT request (j) indicating, in this example, that the user at endpoint B has accepted the invitation to join the RTP session. If the call involves more than one type of media, the user at endpoint B may specify the media to be accepted in the ACCEPT request. For example, if a videoconference is requested, the user at endpoint B may choose to accept the audio and decline the video.

After the user at endpoint B accepts the SIP invitation, the UA 202 sends a MA OPEN request (m) to the MA 206 to open a media connection for an RTP session. The MA 206 at endpoint B opens a UDP connection and sends a MA OPEN response (n) to the UA 202 giving the addresses and port of the media connection for the RTP session. At this point the SIP INVITE request sent at step (e) has not been accepted. The UA 202 at endpoint B sends a SA INVITE response (INVITE 200 OK) to the SA 204 at endpoint B indicating that the SA 204 should accept the invitation to join the RTP session with endpoint A (o). This request includes the media host and port information returned by the MA 206 in the Open response. The SA 204 at endpoint B sends a SIP INVITE response (SIP 200 OK+SDP body) to the SA 204 at endpoint A (p). The SIP INVITE response includes an SDP body confirming the RTP connection parameters required to establish full-duplex communication. The SIP INVITE response is the answer to the SIP INVITE request at step (e). The SA 204 at endpoint A acknowledges the SIP 200 OK response to complete the SIP handshake (q).

At endpoint A, the SA 204 sends an SA INVITE response (r) indicating that the connection requested at step (d) was successfully established. This message includes a call identifier that uniquely identifies the call, and the network address of the host and port at endpoint B used for the media connection. The UA 202 at endpoint A in turn sends a CALL response (s) to the user application 150 indicating that the connection requested at step (a) was successfully established, and sends a PEER request (t) to the MA 206 with the RTP connection parameters contained in the SA INVITE response. At endpoint B, the SA 204 sends an ACK request (u) to the UA 202 responsive to the SIP ACK indicating that the connection with endpoint A was successfully established. The UA 202 in turn sends an ACCEPT response (v) to the user application 150 indicating establishment of a connection with endpoint A. The endpoints A and B can now begin sending and receiving RTP media (w).

To end the session, the user application 150 at endpoint A sends a HANG-UP request to its UA 202 (x). Endpoint B could also end the session in the same manner. The UA 202 at endpoint A sends a SA BYE request to the SA 204 at endpoint B (y) indicating that the RTP session specified in the request should be ended. The SA 204 generates a SIP BYE request (z) based on the SIP session parameters established at step (p) and sends this message to endpoint B. The SA 204 at endpoint B receives the SIP BYE request and replies to acknowledge receipt of the message (aa). At endpoint A, the SA 204 sends a BYE response (bb) to the UA 202 confirming that the RTP session is closed. The UA 202 sends a HANGUP response (cc) to the user application 150 to notify the user application 150 that the RTP session is closed, and sends a CLOSE request (dd) to the MA 206 to close the connection opened for the RTP session. At endpoint B, the SA 204 generates a BYE request and forwards the BYE request to the UA 202 (ee) indicating that the RTP session has been closed. The UA 202 at endpoint B sends a HANGUP request (ff) to the user application 150 to notify the user application that the RTP session is closed, and sends a CLOSE request (gg) to the MA 206 to close the connection opened for the media session (gg).

Figure 8:
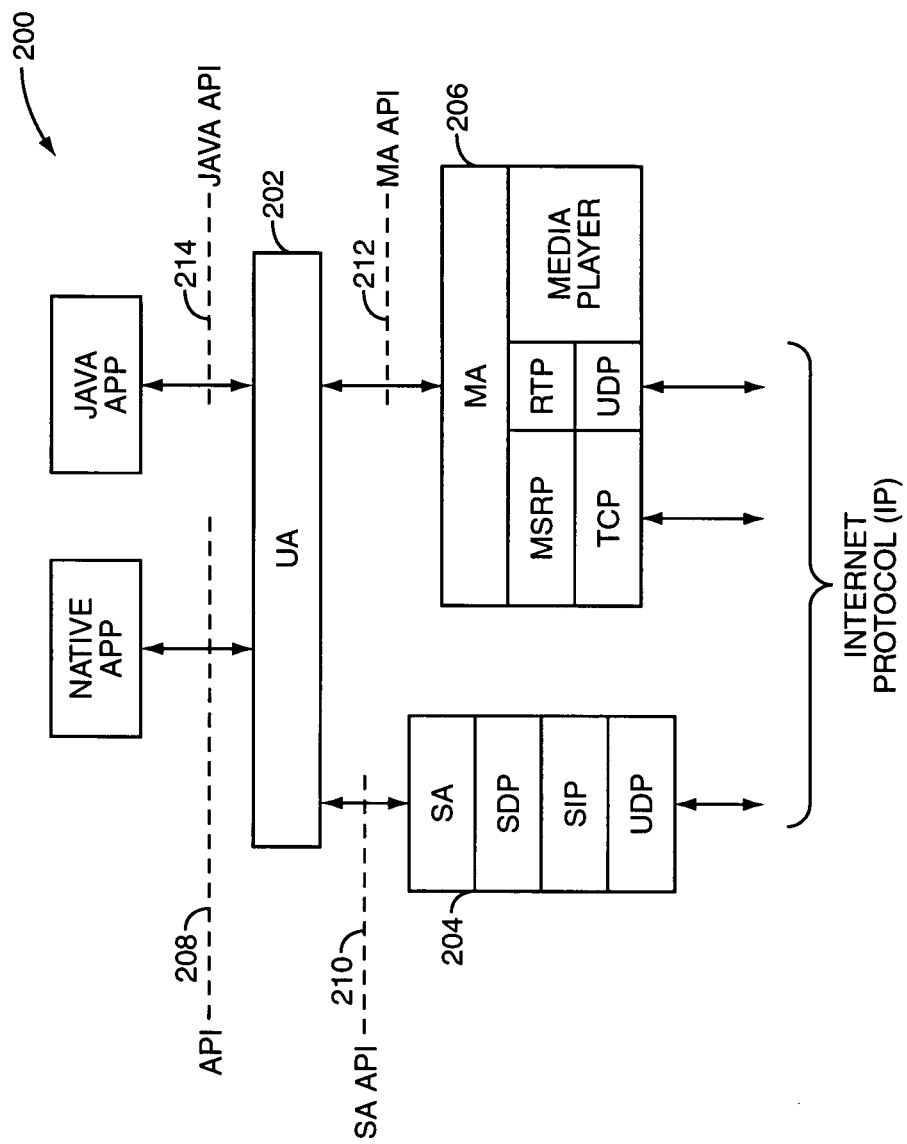
FIG. 8 illustrates an alternate embodiment of the media client with a JAVA application interface.

FIG. 8 illustrates another embodiment of the media client 200 including an application interface for JAVA applications. The embodiment shown in FIG. 8 includes a UA 202, SA 204, and MA 206 as previously described. In addition to the native UA API, the media client 200 in FIG. 8 also includes a JAVA application interface (JAVA API) for JAVA applications. The JAVA API is a connection-oriented application interface. The JAVA API includes commands that allow JAVA applications to register with a SIP proxy, open connections (call), query the capabilities of the remote end, send/receive messages, redirect media strings, and hang-up connections. The JAVA API, like the native IMA API, provides a high level of abstraction that insulates the JAVA applications from the details of the lower level protocols, such as SIP and SDP. The JAVA API enables JAVA applications to communicate with the user agent, while the signaling agent and media agent handle the underlying signaling and media operations. The media client 200 with the JAVA API makes JAVA applications easier to write by handling signaling and operation tasks that are commonly found in JAVA applications. Because the JAVA applications do not have direct access to the lower level protocols, such as SIP and SDP, there is a better chance for the same JAVA application to work in different operator networks and in different mobile terminals. Further, there is less chance of a rogue JAVA application causing problems within the network. JAVA applications also do not need to worry about configuration and deployment issues that come with accessing low-level protocols directly. Instead, configuration and deployment issues are handled by the media client 200. Device manufacturers already use customization processes to configure settings specific to a particular operator's network and can easily configure the media client 200 for a particular operator's network.

Figure 9:
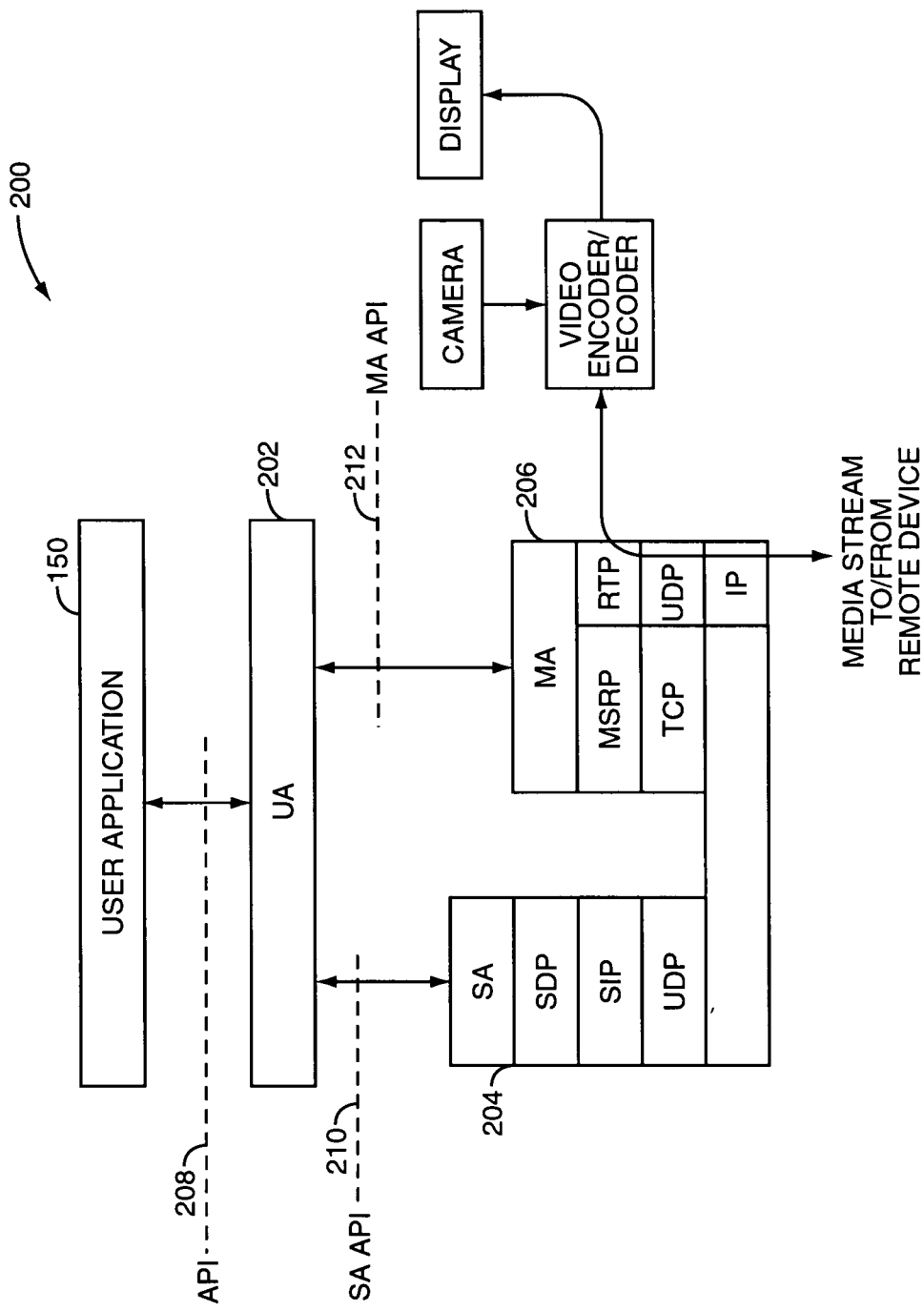
FIGS. 9 and 10 illustrate selective routing of media content according to the present invention.

In some embodiments of the invention, the MA 206 may be capable of routing media directly to media rendering devices, bypassing the user application 150 when the user application 150 does not need to process the data. For example, in media streaming, the user application 150 typically receives the media stream and outputs the media stream to a media player without any data processing. The MA 206 can, in this situation, directly route the media stream to a media player. FIG. 9 illustrates typical streaming of media (e.g., video or audio) from a remote device to a local media rendering device (e.g., speaker and/or display of a mobile terminal 100). The media stream passes through the lower layers of the protocol stack and is routed by the MA 206 directly to a media player, such as a video decoder. The media stream passes up through the IP, UDP and RTP stacks to the video decoder. FIG. 9 also illustrates the output from a camera passing down through the RTP, UDP and IP stacks for transmission to a remote device.

Figure 10:
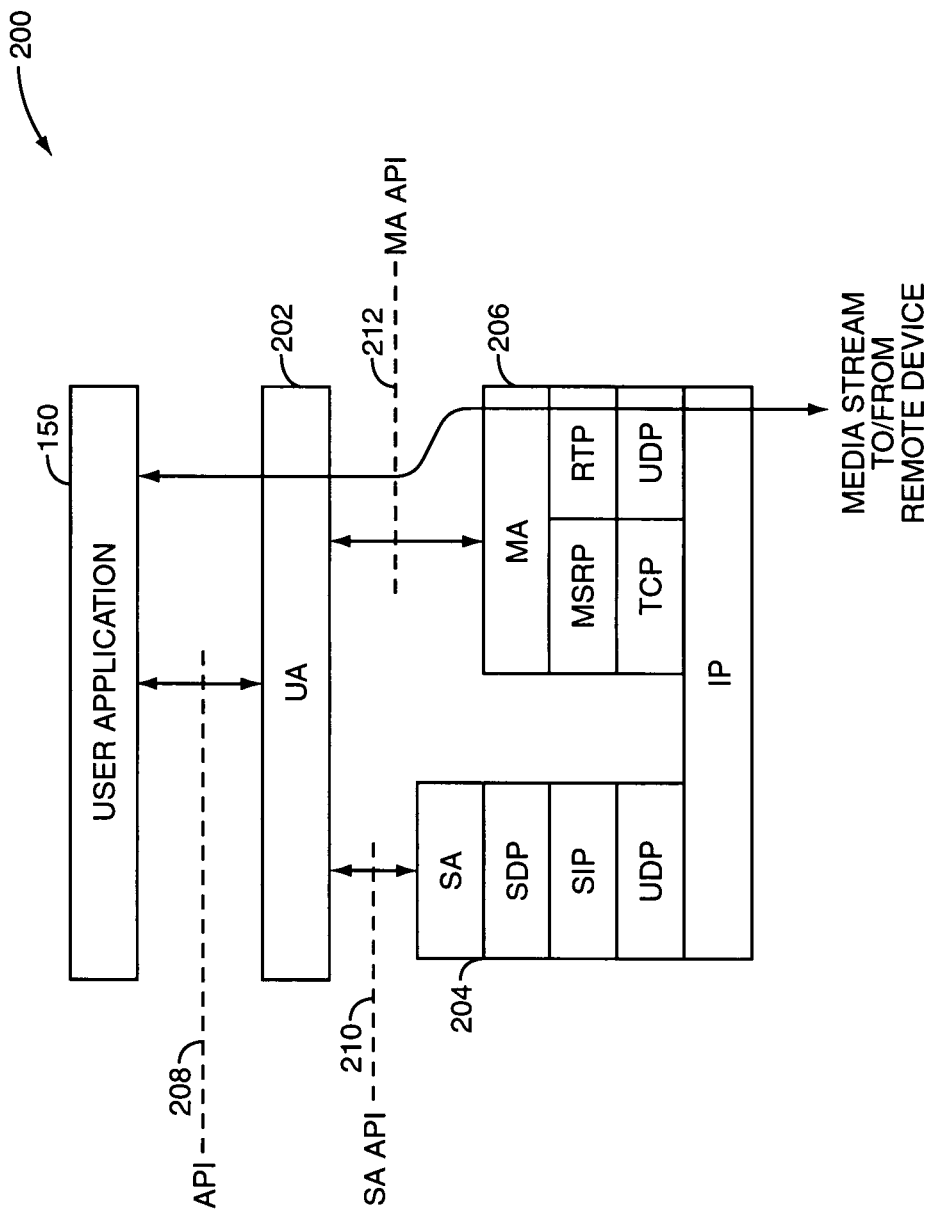

Neither the media stream not the camera output flows into the upper layers of the MA 204 or the application layer. In some applications, the user application 150 may want to receive the media stream. FIG. 10 illustrates a typical media stream to/from the user application.

In a preferred embodiment of the invention, the user application 150 can direct how media or messages are routed. To enable selective routing of media by the user application 150, the UA API may include a SETROUTE request that is sent by the user application 150 to the media client 200 to specify particular sources or sinks for media streams. The sources or sinks may be internal or external to the mobile terminal 100. The MA API includes a corresponding SETROUTE request that is sent by the UA 202 to the MA 206 to configure routing tables specifying how media streams are to be routed. The UA API and MA API may also include other requests to control the media stream, such as a PAUSE request to pause an active media stream, and a RESUME request to resume a paused media stream.

Figure 11:
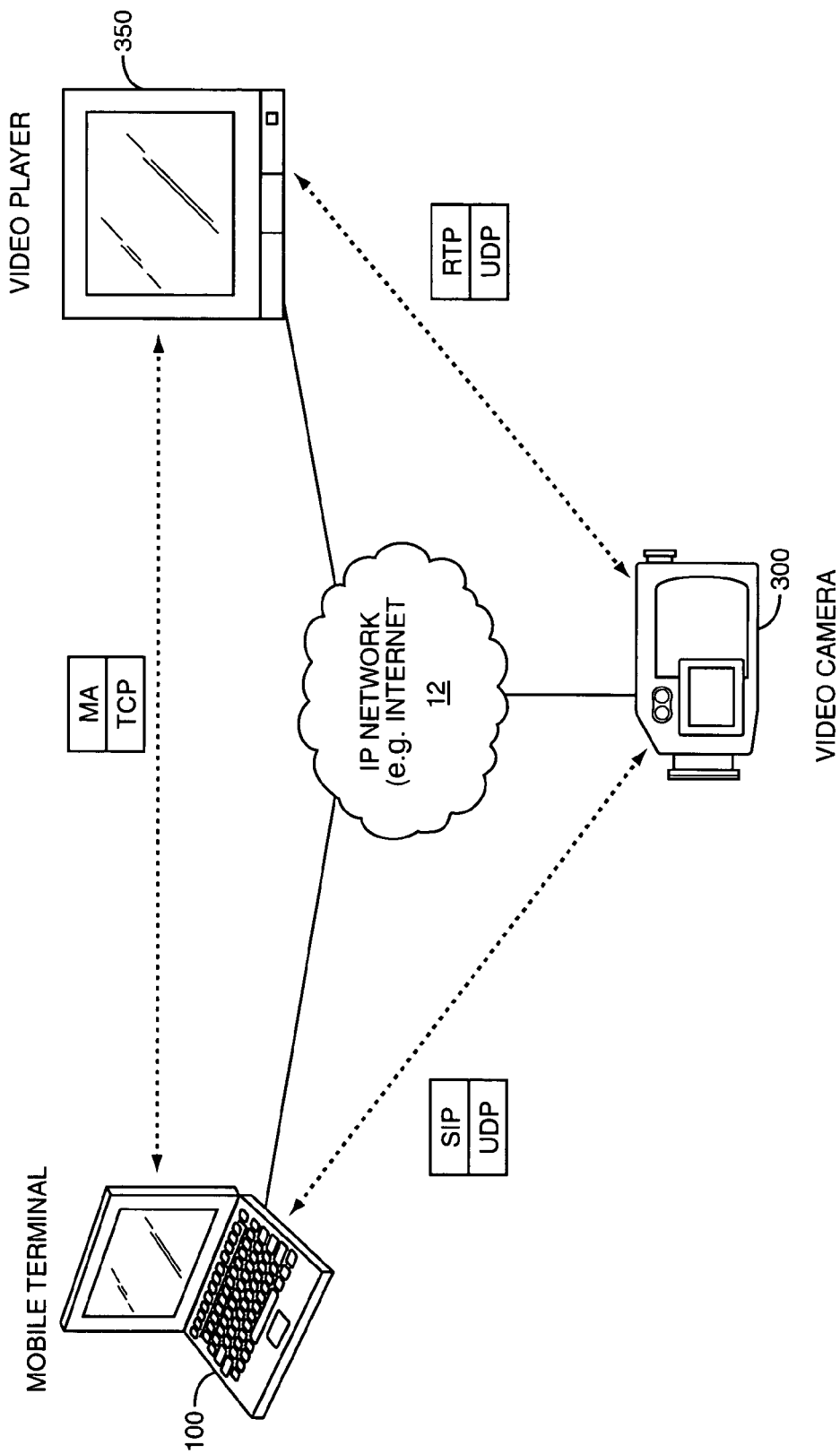
FIG. 11 illustrates an application in which the present invention is used to establish a media session between a video server and a remote video player.
Figure 12:
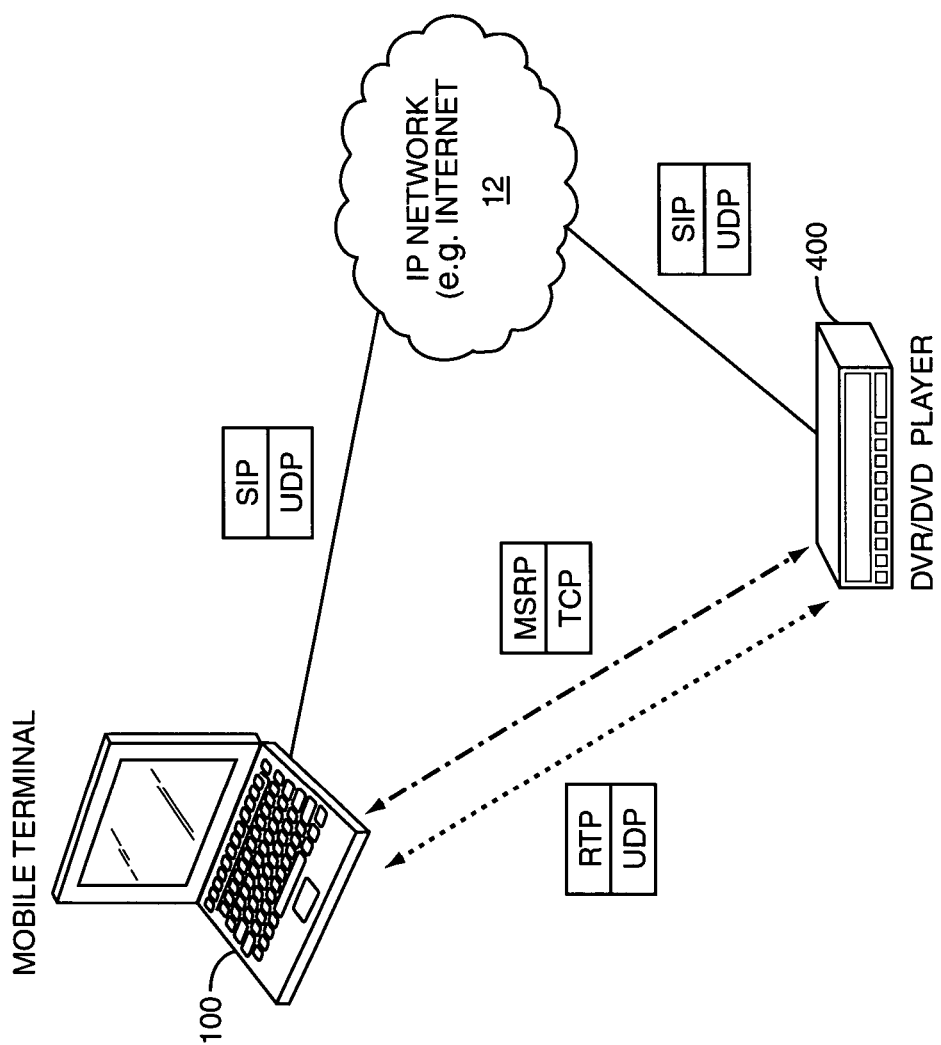
FIG. 12 illustrates an application in which the present invention is used to remotely control a DVD player and to stream media from the remote DVD player to a mobile communication device.

FIGS. 11 and 12 illustrate various ways in which the media client 200 of the present invention may be used. FIG. 11 illustrates three network communication devices—a mobile device 100, a video camera 300, and a video player 350. The mobile device 100 incorporates a media client 200 as illustrated in FIG. 3, including a UA 202, SA 204 and MA 206. The video player 350 incorporates a MA 206. In this example, the user of the mobile device 100 desires to play back video from the video camera 300 to the remote video player 350. This may be useful, for example, to monitor one's home when away on vacation. The UA 202 in the mobile device 100 establishes a TCP connection with the MA 206 in the remote video player 350. The SA 204 in the mobile device 100 establishes a signaling connection with the video camera 300 using SIP. Communications between the mobile device 100, video camera 300 and video player are peer-to-peer over the Internet or other communication network 12.

To initiate a media session, the application 150 in the mobile device 100 uses the procedure shown in FIG. 7. The application 150 initiates the media session by sending a CALL request to the UA 202, which is also located in the mobile device 100. The UA 202 in the mobile device 100 sends an OPEN request to the MA 206 in the remote video player 350 to open a UDP socket connection for the RTP session. The OPEN request is sent over the TCP socket connection. It should be noted that the mobile device 100 in this example is controlling a remotely located MA 206. The MA 206 in the video player 350 returns the network address and the port for the RTP connection to the UA 202 in the mobile device 100. The UA 202 instructs the SA 204 to establish an RTP session by sending an INVITE request to the SA 204. The SA 204 is also located in the mobile device 100. The INVITE request includes the network address and port provided by the MA 206 in the video player 350. The network address and port provided by the video player 350 is included in a SIP INVITE that is sent to the video camera 300. The video camera 300 returns a network address and port for the RTP connection to the SA 204 in the mobile device 100, which in turn provides this information to the UA 202. The UA 202 in the mobile device 100 sends a PEER request to the MA 206 in the video player 350 containing the network address and port provided by the video camera 300 to establish the RTP connection between the video player 350 and video camera 300. The video player 350 can then receive a video stream from the video camera 300.

In the example shown in FIG. 12, there are two networked communication devices—a mobile device 100 and a DVR/DVD player 400, which is referred to herein simply as DVD player 400. The user of the mobile device 100 desires to play back a DVD or stored digital video from a remote DVD player 400 to the mobile device 100. The DVD player 400 may, for example, be located in the user's home. Both the mobile device 100 and DVD player 400 incorporate a media client as shown in FIG. 3. An application in the DVD player 400 controls operation of the DVD player 400 and enables remote control via the Internet as described below. The mobile device 100 remotely controls the DVD player 400 by sending commands to the DVD player 400 using the MSRP. Remote control commands are sent as text messages from the mobile device 100 to the DVD player 400. Exemplary commands suitable for a DVD player include "play," "stop," "pause," "resume," "fast forward," and "select." Using text-based commands sent over MSRP, the mobile device 100 can instruct the DVD player 400 to stream video and/or audio via the Internet to the mobile device 100.

To remotely control the DVD player 400, the mobile device 100 establishes an MSRP session with the DVD player 400 for transmitting commands and/or control signals to the DVD player, and a separate RTP session for streaming video and/or audio from the DVD player 400 to the mobile device 100. The MSRP and RTP sessions are established using procedures as shown in FIGS. 6 and 7, respectively. Using MSRP, the mobile device 100 sends commands to the DVD player 400 as text messages. In this example, the MSRP messages are passed by the media client 200 in the DVD player 400 to an application 150, referred to herein as the remote control application. The remote control application 150 in the DVD player 400 parses the commands sent by the mobile device 100 and controls the DVD player 400 accordingly. As shown in FIGS. 8 and 9, the DVD player 400 may have the ability to selectively route media streams. The remote control application 150 in the DVD player 400, using the SETROUTE request, can instruct the DVD player 400 to send video and/or audio streams to the mobile device 100 within the RTP session. Also, those skilled in the art will recognize that the mobile device 100 could instruct the DVD player 400 to send media to another remote networked communication device.

The method illustrated in FIG. 12 can be used to remotely control a wide variety of devices, such as video cameras, digital still cameras, printers, scanners, copiers, home stereo systems, television, or computer. Also, those skilled in the art will recognize that media can be streamed from the mobile device 100 to a remote device. For example, the invention could be used to stream audio from a portable DVD or CD player to a home computer so that the audio can be recorded and stored on the home computer. As another example, the present invention could be used to stream video and/or audio from a portable video camera to a home computer to record and store the video and/or audio on the home computer.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

TABLE 1

Appendix A
UA API

| MESSAGE | USE | SYNTAX | PARAMETERS | PARAMETER DESCRIPTION |
|---|---|---|---|---|
| Register Request | Sent by IMS application to IMS UA to initiate registration with a SIP proxy | register userid address[:port] | userid<br>address<br>port | User identifier to register with the registrar.<br>Address of registrar.<br>Optional proxy port number, default is 5060. |
| Register Response | Sent by IMS UA to IMS application in response to a register request | register userid address:port status_message[:status_code] | userid<br>address<br>port<br>status_message<br><br>status_code | User identifier registered with the registrar.<br>Address of the registrar.<br>Port number of the registrar.<br>Status of request indicating success (e.g. "OK") or failure (e.g., "Failed")<br>Optional code indicating status of register request, 200 if the request was successful or an error code on failure. |
| Subscribe Request | Sent by IMS application to IMS UA to subscribe to a presence service. | subscribe uri expiretime event_type[:id] [autorefresh] | uri<br>expiretime<br>event_type<br><br>id<br><br>autorefresh | Address<br>Time before the subscribe expires in seconds.<br>Event for which the IMS application is subscribing and for which it will receive subsequent notification events..<br>Optional id used to request notification for only a certain subset of events.<br>Optional flag instructing the UA to refresh the subscription automatically when it expires. If the application does not want the UA to automatically refresh the subscription, the flag is omitted. |
| Subscribe Response | Sent by IMS UA to IMS application in response to a subscribe request | subscribe uri expiretime status_message[:status_code[:new uri]] | uri<br>expiretime<br><br><br>status_message<br><br>status_code<br><br>new_uri | Address.<br>Sometimes the server ignores the requested expire time and sets it to another value. This parameter returns the expiretime selected by the server.<br>Status of request indicating success (e.g. "OK") or failure (e.g., "Failed")<br>Optional code indicating status of subscribe request, 200 if the request was successful or an error code on failure.<br>Sometimes the subscribe might fail because of a redirect request. In this case, the proxy supplies a new uri. The UA re-subcribes to this new uri and then returns the uri to the application in this parameter. |
| Notify Request | Sent by IMS UA to IMS application to deliver presence state information for presence services | notify message_len event_type[:id] mime_type\nmessage_body | message_len<br><br><br><br>event_type<br>id<br><br>mime_type<br>message_body | Length of the message_body, excluding the message header fields. A new-line character (\n) separates the last message header field (mime_type) and the message_body.<br>Event that caused the notification to be received.<br>Optional id indicating the subset of events for which the notification was received.<br>Mime type for the message body.<br>Body of the notification message, typically XML format. |
| Notify Response | Sent by IMS application to UA to acknowledge notify request | notify status_message | status_message | Indicates receipt of notify request, e.g. "OK" |
| Publish Request | Sent by IMS application to IMS UA to publish change in the user's presence status | publish uri expire_time [autorefresh] | uri<br>expiretime<br>autorefresh | Address.<br>Time before the publish expires in seconds.<br>Optional flag instructing the UA to refresh the publish automatically when it expires. If the application does not want the UA to automatically refresh the publish, the flag is omitted. |
| Publish Response | Sent by IMS UA to IMS application responsive to Publish request | publish uri expiretime status_message[:status_code] | uri<br>expiretime<br><br><br>status_message<br><br>status_code | Address.<br>Sometimes the server ignores the requested expire time and sets it to another value. This parameter returns the expiretime selected by the server.<br>Status of request indicating success (e.g. "OK") or failure (e.g., "Failed")<br>Optional code indicating status of publish request, 200 if the request was successful or a failure code on failure. |
| Call Request | Sent between IMS application and IMS UA to initiate MSRP and RTP sessions | call userid [userid@remotehost[:port]] call_type1...call_typeN | userid<br><br><br><br><br>host:port<br><br><br><br><br>call_type | At the originating endpoint, the IMS application specifies a userid to call when sending Call request if registered with a proxy. At the terminating endpoint the UA specifies the userid of the calling party.<br>At the originating endpoint, the UA specifies the host address and port to call, if not registered with a proxy. At the terminating endpoint the UA specifies the userid of the network address and port designated by the calling party for the call.<br>Type of call to be established, for example audio/amr or video/h263. Multiple call_types may be listed, e.g., audio/amr and video/h263 for video telephony |

TABLE 1-continued

Appendix A
UA API

| MESSAGE | USE | SYNTAX | PARAMETERS | PARAMETER DESCRIPTION |
|---|---|---|---|---|
| Call Response | Sent by IMS UA to IMS application responsive to Call request | call userid[@remotehost[:port]] status_message[:status_code] call_id call_type | userid | If registered with a proxy, the call response returns the userid of the called party. |
| | | | host:port | If not registered with a proxy, the call response returns the address and port of the called party using this syntax. |
| | | | call_id | UA returns a session identifier (or handle) to the IMS application so that the application may reference this session in subsequent UA requests such as MSG and Hangup. |
| | | | status_message | Status of call request indicating success (e.g. "OK" or "Connected") or failure (e.g., "Failed") |
| | | | status_code | Optional code indicating status of call request, 200 if the request was successful or a failure code on failure. |
| | | | call_type | Type of call that was made to the called party, for example audio/amr or video/h263. |
| MSG Request | Sent from IMS application to IMS UA to deliver multimedia messages | msg call_id message_len mime_type\nmessage_body | call_id | Identifier (or handle) of the session in which the message should be sent. |
| | | | message_len | Length of the message_body, excluding the message header fields. A new-line character (\n) separates the last message header field (mime_type) and the message_body. |
| | | | mime_type | Mime type for the message body. |
| | | | message body | Multimedia message body, i.e., application text or binary data, containing message_len bytes. |
| MSG Response | Sent from IMS UA to IMS application to indicate status of MSG request | msg status_message[:status_code] | status message | Status of request indicating success (e.g. "OK") or failure (e.g., "Failed") |
| | | | status_code | Optional code indicating status of MSG request, 200 if the request was successful or a failure code on failure. |
| Hangup Request | Sent between IMS application and IMS UA to terminate a session | hangup call_id | call_id | Identifier (or handle) of the session to terminate. |
| Hangup Response | Sent by UA to IMS application to indicate status of hangup request | hangup status_message[:status_code] | status_message | Confirms that call is ended after hangup request. |
| | | | status_code | Optional code indicating status of hangup request, 200 if the request was successful or a failure code on failure. |
| Accept Request | Sent from IMS UA to IMS application to solicit acceptance of incoming call | accept command[:code] [call_type] | command | Instructs UA to accept (e.g. Yes) or reject (e.g. No) a call. |
| | | | code | Optional code to provide additional information, such as reason call was rejected. |
| | | | call_type | Optional parameter used to indicate accepted media type when less than all proposed media types are accepted. When not specified all media types are accepted. This parameter is not used when call is rejected. |
| Accept Response | Sent from IMS application to IMS UA to indicate that connection has been established for accepted media types | accept status_message[:status_code] | status_message | Status of request indicating success (e.g. "OK") or failure (e.g., "Failed") |
| | | | status_code | Optional code indicating status of accept request, 200 if the request was successful or a failure code on failure. |
| | | | call_type | Optional parameter used when less than all media types specified in call request have been accepted. |
| Status Response | Provisional response sent from IMS UA to IMS application to indicate status of a pending request, such as a provisional response to a call request | status status_message[:status_code] | status_message | Status of request indicating success (e.g. "OK") or failure (e.g., "Failed") |
| | | | status_code | Optional code indicating status of request, e.g. 180 to indicate ringing of called party in response to call request |
| Setroute Request | Sent from IMS application to IMS UA to indicate desired routing fro a media stream | setroute call_id call_type source sink | call_id | Identifies session to which setroute request applies |
| | | | call_type | Identifies media type/stream to which setroute request applies |
| | | | source | Specifies source for media type specified in call_type parameter |
| | | | sink | Specifies sink for media type specified in call_type parameter |
| Pause Request | Sent from IMS application to IMS UA to pause a media stream | pause call_id call_type | call_id | Identifies session to which pause request applies |
| | | | call_type | Identifies media type/stream to pause |
| Resume Request | Sent from IMS application to IMS UA to resume a media stream that has been paused | | call_id | Identifies session to which resume request applies |
| | | | call_type | Identifies media type/stream to resume |

TABLE 1-continued

Appendix A
UA API

| MESSAGE | USE | SYNTAX | PARAMETERS | PARAMETER DESCRIPTION |
|---|---|---|---|---|
| Set Request | Sent from IMS application to IMS UA to set parameters | set param value | param | Name of parameter to be set, e.g., username, alias, contactaddress, default source, default sink, etc. |
| | | | value | Value of parameter being set |

TABLE 2

Appendix B
SA API

| MESSAGE | USE | SYNTAX | PARAMETERS | PARAMETER DESCRIPTION |
|---|---|---|---|---|
| Register Request | Sent by UA to SA to initiate registration with a SIP proxy | register address[:port] | address | Address of the proxy |
| | | | port | Optional proxy port number, default is 5060 |
| | | register userid | userid | User identifier registered with the proxy. |
| Register Response | Sent by IMS SA to UA in response to a register request | address:port status_message[:status_code] | address | Address of the registrar or proxy. |
| | | | port | Port number of the proxy. |
| | | | status_message | Status of register request indicating success (e.g. "OK") or failure (e.g., "Failed") |
| | | | status_code | Optional code indicating status of register request, 200 if the request was successful or an error code on failure. |
| Subscribe Request | Sent by UA to SA to subscribe to a presence service. | subscribe uri expiretime event_type[:id] [autorefresh] | uri | Address |
| | | | expiretime | Time before the subscribe expires, in seconds |
| | | | event_type | Event for which the notification has been received. Currently only the presence event is supported. |
| | | | id | Optional id to request notification for only a certain subset of events |
| | | | autorefresh | Optional flag instructing the UA to refresh the subscription automatically when it expires. If the application does not want the UA to automatically refresh the subscription, the flag is omitted. |
| Subscribe Response | Sent by SA to UA responsive to Subscribe request | subscribe uri expiretime status_message[:status_code[:new_uri]] | uri | Address |
| | | | expiretime | Sometimes the server ignores the requested expire time and sets it to another value. This parameter contains the expiretime selected by the server. |
| | | | status_message | Status of subscribe request indicating success (e.g. "OK") or failure (e.g., "Failed") |
| | | | status_code | Optional code indicating status of the subscribe request, 200 if the request was successful or an error code on failure.. |
| | | | new_uri | Sometimes the subscribe might fail because of a redirect request. In this case, the proxy supplies a new uri. The new uri is passed to the UA in this field. |
| Notify Request | Sent by SA to UA to deliver presence state information for presence services | notify message_len uri event_type[:id] mime_type\nmessage_body | message_len | Length of the message body excluding the message header fields. A new-line character(/n) separates the last message header filed (mime type) and the message body. |
| | | | event_type | Event that caused the notification to be received. |
| | | | id | Optional id indicating the subset of events for which the notification was received. |
| | | | mime_type | Mime type for the message body |
| | | | message body | Message content |
| Publish Request | Sent by UA to SA to publish change in the user's presence status | publish uri expire_time [autorefresh] | uri | Address |
| | | | expiretime | Time before the publish expires, in seconds |
| | | | autorefresh | Optional flag instructing the UA to refresh the published information automatically. |
| Publish Response | Sent by IMS client to IMS application responsive to Publish request | Publish uri expiretime status_message[:status_code] | uri | Address |
| | | | expiretime | Sometimes the server ignores the requested expire time value and sets it to another value, this parameter contains the expiretime sent by the server |
| | | | status_message | Status of publish request indicating success (e.g. "OK") or failure (e.g., "Failed") |
| | | | status_code | Optional code indicating status of publish request, 200 if the publish was successful or an error code on failure |
| Invite Request | Sent by UA to SA for calling party to initiate session. | Invite userid remotehost:port call_type host:port | userid | Identifies called party |
| | | | remotehost:port | Identifies the remotehost address and port to call (or called party). |

TABLE 2-continued

Appendix B
SA API

| MESSAGE | USE | SYNTAX | PARAMETERS | PARAMETER DESCRIPTION |
|---|---|---|---|---|
| | Sent by SA to UA for called party to notify UA that SIP invite request was received. | . . . call_type host:port | call_type | Type of call to be established, for example audio/amr or video/h263. |
| | | | host:port | Identifies address and port to be used for the media session. This information is obtained in Listen response (MSRP) or Open response (RTP) from MA. A different host:port may be used for each call type |
| Invite Response | Sent by SA to UA to report status of invite request | Invite status_message[:status_code] call_type host:port . . . call_type host:port call_id | status_message | Status of invite request indicating success (e.g. "OK") or failure (e.g., "Failed"). |
| | | | status_code | Optional code indicating status of invite request, 200 if the subscribe was successful or an error code on failure. |
| | | | call_type | Type of call to be established, for example audio/amr or video/h263. Used only when Invite request is successful. |
| | | | host:port | Host address and port for media specified in call_type. Used only when Invite request is successful. |
| | | | call_id | Uniquely identifies call. Assigned by SA. Used only when Invite request is successful. This parameter is omitted in Invite response sent from UA to SA. |
| Bye Request | Sent by UA to SA to terminate a session | bye call_id | call_id | Identifies call to be closed |
| Bye Response | Sent by SA to UA to indicate status of bye request | bye status_message[:status_code] | status_message | Status of bye request indicating success (e.g. "OK") or failure (e.g., "Failed") |
| | | | status_code | Optional code indicating status of bye request, 200 if the subscribe was successful or an error code on failure. |
| Status Response | Provisional response sent from SA to UA to indicate status of a pending request, such as a provisional response to an invite request | status status_message[:status_code] | status_message | Describes status condition, e.g "Trying" or "Ringing" |
| | | | status_code | Optional code indicating status condition |
| ACK Request | Sent by SA to UA to responsive to SIP ACK | ACK call_id | call_id | Uniquely identifies call. Assigned by SA. |
| Set Request | Sent from UA to SA to set parameters | set param value | param | Name of parameter to be set, e.g., username, alias, contactaddress, default source, default sink, etc. |
| | | | value | Value of parameter being set |

TABLE 3

Appendix C
MA API

| MESSAGE | USE | SYNTAX | PARAMETERS | PARAMETER DESCRIPTION |
|---|---|---|---|---|
| Listen Request | Sent by UA to MA to initiate a MSRP session. The MA opens a TCP listener in response to the Listen request. | listen [remotehost] | remotehost | Optional parameter specifies address from which connections can be made. |
| Listen Response | Sent by MA to UA as final response to Listen request. The Listen response includes the address and port of the TCP connection opened for the MSRP session. | listen status_message[:status_code] host:port | status_message | Status of listen request indicating success (e.g. "OK") or failure (e.g., "Failed") |
| | | | status_code | Optional code indicating status of Listen request, 200 if the request was successful or an error code on failure. |
| | | | host:port | Network address of host and port number for port opened in response to Listen Request. Returned when Listen request is successful. Omitted when Listen request fails. |
| Open Request | Sent by UA to MA to initiate RTP session. The MA opens a TCP connection in response to the Open request. | open [remotehost] | remotehost | Optional address specifies address from which connections can be made. |

TABLE 3-continued

Appendix C
MA API

| MESSAGE | USE | SYNTAX | PARAMETERS | PARAMETER DESCRIPTION |
| --- | --- | --- | --- | --- |
| Open Response | Sent by MA to UA as final response to Open request. The Open response includes the address and port of the TCP connection opened for the RTP session. | listen status_message[:status_code] host:port | status_message status_code host:port | Status of open request indicating success (e.g. "OK") or failure (e.g., "Failed") Optional code indicating status of Open request, 200 if the request was successful or an error code on failure. Network address of host and port number for port opened in response to Listen Request. Returned when Listen request is successful. Omitted when Listen request fails.. |
| Peer Request | Sent by UA to MA to give MA the peer network address and port for the media connection | Peer host:port | host:port | Network address of peer and port for media connection |
| Send Request | Sent by UA to MA to deliver multimedia messages | Send call_id message_len mime_type\nmessage_body | call_id message_len mime_type message_body | Identifies call or session in which a message is to be sent Gives the length of message being sent Specifies media type of message being transmitted Message content |
| Send Response | Sent by MA to UA to indicate status of send request | Send call_id status_message[:status_code] | call_id status_message status_code | Call or session specified in send request Status of send request indicating success (e.g. "OK") or failure (e.g., "Failed") Optional code indicating status of send request, 200 if the request was successful or an error code on failure. |
| Connect Request | Sent by UA to MA to establish connection with peer. Typically sent after receving an Invite Request from peer. | connect host:port | host:port | Network address of peer and port for media connection specified in Invite Request |
| Connect Response | Sent by MA to UA to indicate status of connect request | connect status_message[:status_code] | status_message status_code | Status of connect request indicating success (e.g. "OK" of "Connected") or failure (e.g., "Failed") Optional code indicating status of connect request, 200 if the request was successful or an error code on failure. |
| Close Request | Sent by UA to MA to terminate media connection and close port opened for media connection | close host:port | host:port | Network address of host and port to be closed |
| Setroute Request | Sent from UA to MA to indicate desired routing for a media stream | setroute call_id call_type source sink | call_id call_type source sink | Identifies session to which setroute request applies Identifies media type/stream to which setroute request applies Specifies source for media type specified in call_type parameter Specifies sink for media type specified in call_type parameter |
| Pause Request | Sent from UA to MA to pause a media stream | pause call_id call_type | call_id call_type | Identifies session to which pause request applies Identifies media type/stream to pause |
| Resume Request | Sent from UA to MA to resume a media stream that has been paused | | call_id call_type | Identifies session to which resume request applies Identifies media type/stream to resume |
| Set Request | Sent from UA to MA to set parameters | set param value | param value | Name of parameter to be set, e.g., username, alias, contactaddress, default source, default sink, etc. Value of parameter being set |

What is claimed is:

1. A system of host devices configured to enable communication between a networked communication device and a remote device, the system of host devices comprising:
   memory; and
   one or more processors communicatively coupled to the memory and configured to execute a media client for the networked communication device, the media client comprising:
   a user agent to communicate with a multimedia application in the networked communication device;
   a first network interface for communications between the user agent and the multimedia application;
   a signaling agent under the control of the user agent to perform signaling operations to establish and terminate media sessions between the multimedia application in the networked communication device and a remote device;
   a media agent under the control of the user agent to send multimedia messages and receive multimedia messages as part of an established media session between the multimedia application in the networked communication device and a remote device;
   a second network interface for communications between the user agent and signaling agent; and
   a third network interface for communications between the user agent and media agent;
   wherein the media agent is located remotely from the multimedia application.

2. The system of claim 1 wherein the user agent is located remotely from the multimedia application.

3. The system of claim 2 wherein the user agent is located in a network server.

4. The system of claim 1 wherein the signaling agent is located remotely from the multimedia application.

5. The system of claim 4 wherein the signaling agent is located in a network server.

6. The system of claim 1 wherein the signaling agent is located remotely from the user agent.

7. The system of claim 1 wherein the media agent is located in a network server.

8. The system of claim 1 wherein the media agent is located remotely from the user agent.

9. The system of claim 1 wherein the first, second and third network interfaces comprise TCP connections.

10. The system of claim 1 wherein the user agent, signaling agent and media agent reside within a network server within a communication network, and wherein the multimedia application resides in a networked communication device and remotely accesses the media client.

11. The system of claim 1 wherein the media agent further comprises one or more media player(s), and wherein the media agent selectively routes media streams between the multimedia application and at least one of the one or more media player(s) responsive to commands from the multimedia application.

12. The system of claim 1 wherein the user agent includes a JAVA application interface.

* * * * *